United States Patent
Kolouri et al.

(10) Patent No.: US 12,468,949 B2
(45) Date of Patent: Nov. 11, 2025

(54) SYSTEMS AND METHODS FOR FEW-SHOT TRANSFER LEARNING

(71) Applicant: HRL LABORATORIES, LLC, Malibu, CA (US)

(72) Inventors: Soheil Kolouri, Calabasas, CA (US); Mohammad Rostami, Malibu, CA (US); Kyungnam Kim, Oak Park, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 1256 days.

(21) Appl. No.: 16/532,321

(22) Filed: Aug. 5, 2019

(65) Prior Publication Data

US 2020/0130177 A1 Apr. 30, 2020

Related U.S. Application Data

(60) Provisional application No. 62/752,166, filed on Oct. 29, 2018.

(51) Int. Cl.
*G06N 3/084* (2023.01)
*B25J 9/16* (2006.01)
(Continued)

(52) U.S. Cl.
CPC .............. *G06N 3/084* (2013.01); *B25J 9/163* (2013.01); *G06F 18/24* (2023.01); *G06N 3/045* (2023.01)

(58) Field of Classification Search
CPC .... G06N 3/0454; G06N 3/0472; G06N 20/00; G05D 1/0088
See application file for complete search history.

(56) References Cited

U.S. PATENT DOCUMENTS

| 2019/0130220 A1* | 5/2019 | Zou ..................... G05D 1/0088 |
| 2019/0251480 A1* | 8/2019 | Garcia Duran ..... G06F 16/9024 |
| 2020/0005154 A1* | 1/2020 | Herbster .............. G06N 3/0472 |

FOREIGN PATENT DOCUMENTS

| CN | 108898218 A | 11/2018 |
| CN | 111709315 A | 9/2020 |
| CN | 111898095 A | 11/2020 |

OTHER PUBLICATIONS

Kolouri, Soheil, Yang Zou, and Gustavo K. Rohde. "Sliced Wasserstein kernels for probability distributions." *Proceedings of the IEEE Conference on Computer Vision and Pattern Recognition*. 2016, pp. 5258-5267.

(Continued)

*Primary Examiner* — Weiming He
(74) *Attorney, Agent, or Firm* — Lewis Roca Rothgerber Christie LLP

(57) ABSTRACT

A method for training a controller to control a robotic system includes: receiving a neural network of an original controller for the robotic system based on origin data samples from an origin domain and labels in a label space, the neural network including encoder and classifier parameters, the neural network being trained to: map an input data sample from the origin domain to a feature vector in a feature space using the encoder parameters; and assign a label of the label space to the input data sample using the feature vector based on the classifier parameters; updating the encoder parameters to minimize a dissimilarity, in the feature space, between: origin feature vectors computed from the origin data samples; and target feature vectors computed from target data samples from a target domain; and updating the controller with the updated encoder parameters to control the robotic system in the target domain.

22 Claims, 20 Drawing Sheets

(51) Int. Cl.
G06F 18/24 (2023.01)
G06N 3/045 (2023.01)

(56) References Cited

OTHER PUBLICATIONS

Hagan, M.T. and Menhaj, M.B., 1994. "Training feedforward networks with the Marquardt algorithm." *IEEE transactions on Neural Networks*, 5(6), pp. 989-993.

LeCun, Yann, et al. "Backpropagation applied to handwritten zip code recognition." *Neural computation* 1.4 (1989): 541-551.

Kolouri, S.; Martin, C. E.; and Rohde, G. K. 2018. "Sliced-Wasserstein Autoencoder: An embarrassingly simple generative model." arXiv preprint arXiv:1804.01947, pp. 1-25.

Y. LeCun, L. Bottou, Y. Bengio, and P. Haffner. "Gradient-based learning applied to document recognition." *Proceedings of the IEEE*, 86(11):2278-2324, Nov. 1998.

Y. Netzer, T. Wang, A. Coates, A. Bissacco, B. Wu, A. Y. Ng. "Reading Digits in Natural Images with Unsupervised Feature Learning." *NIPS Workshop on Deep Learning and Unsupervised Feature Learning 2011*, pp. 1-9.

Schwegmann, C.; Kleynhans, W.; Salmon, B.; Mdakane, L.; and Meyer, R. 2016. "Very deep learning for ship discrimination in synthetic aperture radar imagery." *In IEEE International Geo. and Remote Sensing Symposium*, 104-107.

Ghifary, M.; Kleijn, W. B.; Zhang, M.; Balduzzi, D.; and Li, W. 2016. "Deep reconstruction-classification networks for unsupervised domain adaptation." In *European Conference on Computer Vision*, 597-613. Springer.

Hull, Jonathan J. "A database for handwritten text recognition research." *IEEE Transactions on pattern analysis and machine intelligence* 16.5 (1994): 550-554.

Simard, P. Y.; Steinkraus, D.; and Platt, J. C. 2003. "Best practices for convolutional neural networks applied to visual document analysis." In *Seventh International Conference on Document Analysis and Recognition*, 2003. Proceedings, 958-963.

Lee, Chen-Yu, "Sliced Wasserstein Discrepancy for Unsupervised Domain Adaptation," Proceedings of the IEEE Conference on Computer Vision and Pattern Recognition (2019), pp. 10285-10295.

International Search Report and Written Opinion for International Application No. PCT/US2019/045169, dated Nov. 8, 2019, 26 pages.

Murez, Zak et al., *Image to Image Translation for Domain Adaptation*, Jun. 18, 2018, pp. 4500-4509, 2018 IEEE/CVF Conference on Computer Vision and Pattern Recognition.

Shen, Jian et al., *Wasserstein Distance Guided Representation Learning for Domain Adaptation*, Jul. 5, 2017, 12 pages.

Deshpande, Ishan et al., *Generative Modeling using the Sliced Wasserstein Distance*, Mar. 29, 2018, 13 pages.

Wu, Jiqing et al., *Sliced Wasserstein Generative Models*, Jun. 8, 2017, 16 pages.

Zhang, Weichen et al., *Collaborative and Adversarial Network for Unsupervised domain adaptation*, Jun. 18, 2018, pp. 3801-3809.

Zou, Yang et al., *Unsupervised Domain Adaptation for Semantic Segmentation via Class-Balanced Self-training*, Oct. 7, 2018, 17 pages.

Chinese Office Action for Application No. 201980078039.6, dated May 30, 2023, 8 pages.

\* cited by examiner

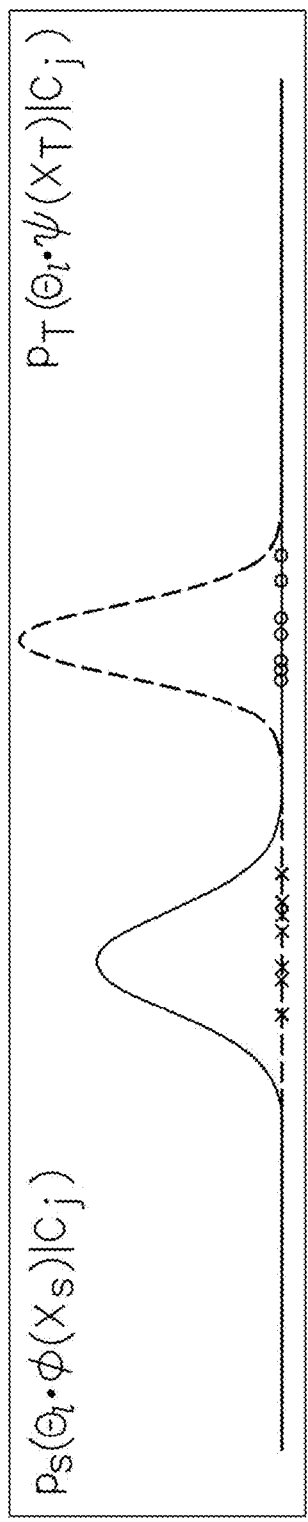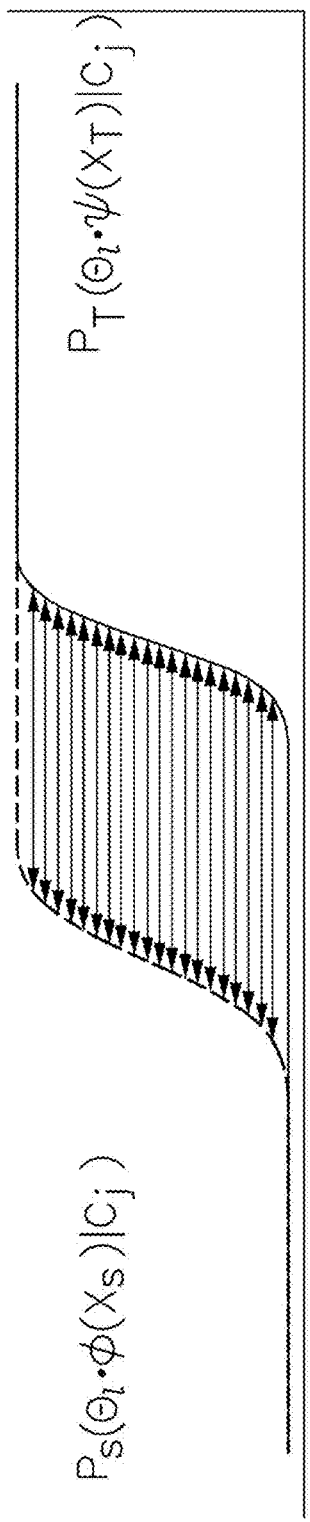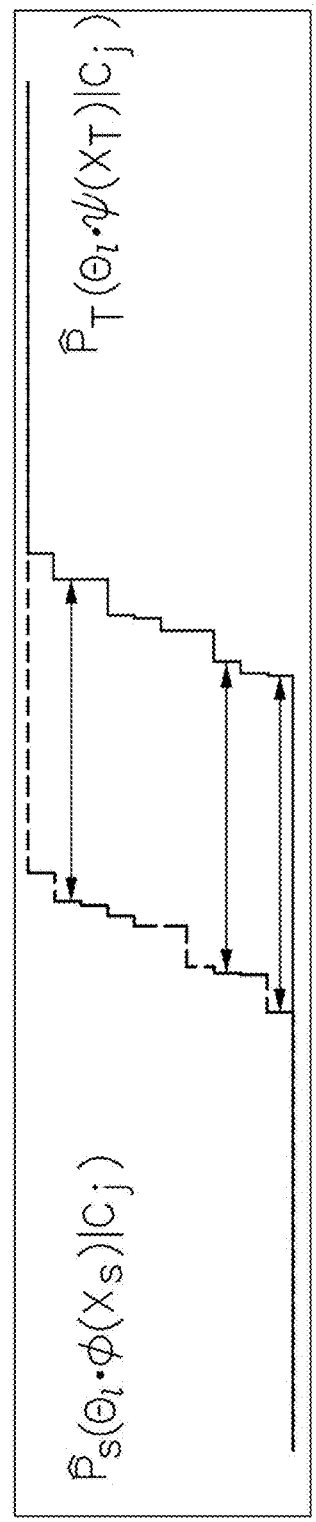

FIG. 5A

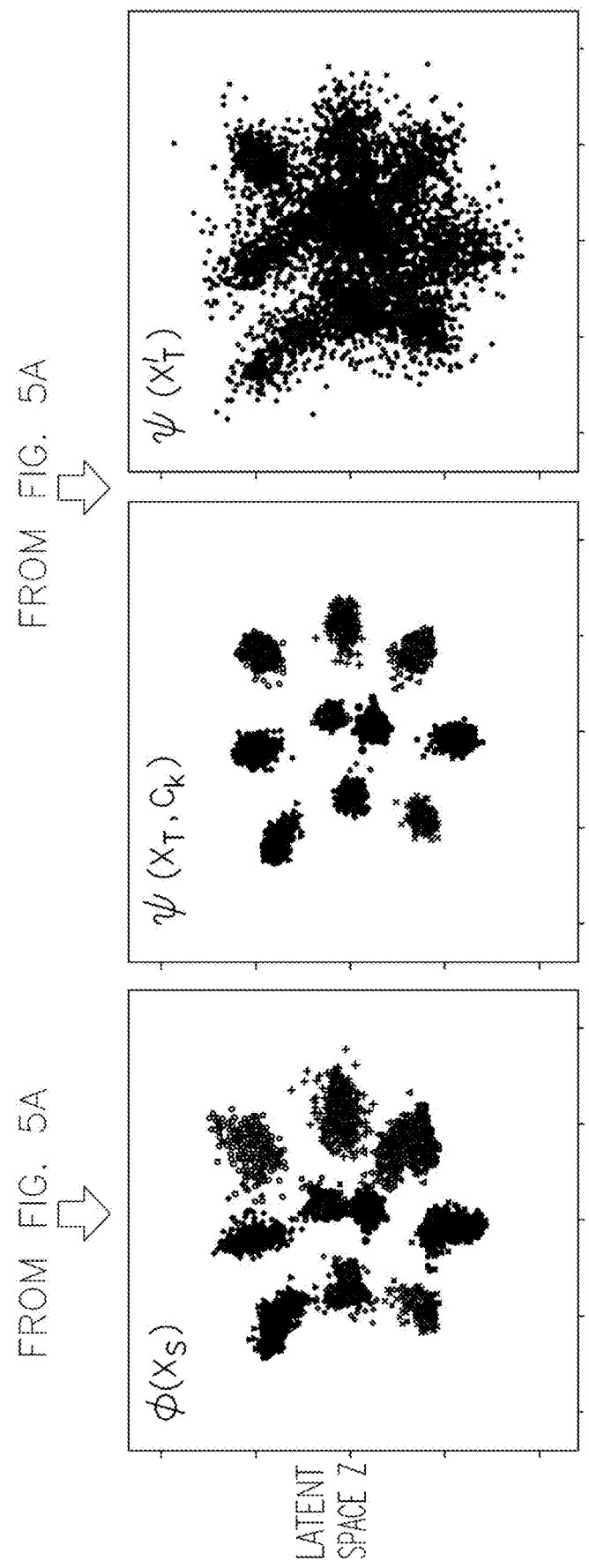

TO FIG. 11B

SYSTEMS AND METHODS FOR FEW-SHOT TRANSFER LEARNING

CROSS-REFERENCE TO RELATED APPLICATION(S)

This application claims the benefit of U.S. Provisional Patent Application No. 62/752,166, "SYSTEM AND METHOD FOR FEW-SHOT TRANSFER LEARNING," filed in the United States Patent and Trademark Office on Oct. 29, 2018, the entire disclosure of which is incorporated by reference herein.

FIELD

Aspects of embodiments of the present invention relate to the field of machine learning.

BACKGROUND

Developments in machine learning, such as deep learning, have led to algorithms with high performance in a wide range of applications. However, these techniques typically depend on the availability of huge labeled datasets to train the algorithms. In some scenarios, large datasets are not available for training, such as when data labeling and annotation is expensive, or when, due to drifts in the data distribution, the training and deployment datasets have different distributions (e.g., the labeled data that is available for training is very different from the data seen in the real world).

Some approaches to addressing the problem of labeled data scarcity include transfer learning and domain adaptation (the terms are sometimes used interchangeably), which are closely related paradigms used to improve learning speed and model generalization. These approaches overcome labeled data scarcity in a target domain of interest by transferring knowledge effectively from a related source domain where labeled data is available.

SUMMARY

Aspects of embodiments of the present invention relate to systems and methods for transfer learning between two domains. Knowledge transfer may be used to overcome labeled data scarcity in one domain by adapting a model trained on a different, but related, domain. Some aspects of embodiments of the present invention relate to learning a domain-agnostic intermediate embedding of the data samples (e.g., mapping the data samples into a feature space), such as learning an embedding using unsupervised domain adaptation (UDA) by minimizing a discrepancy between the distributions of the source and target domains in the embedding space. In more detail, in some embodiments of the present invention, the discrepancy is calculated using a sliced Wasserstein distance (SWD) between the distributions in the embedding space (or in feature space). Some aspects of embodiments of the present invention relate to computing pseudo-labels for the selected unlabeled samples in the target domain in order to align the corresponding classes in the embedding space.

According to one embodiment of the present invention, a method for training a controller to control a robotic system in a target domain includes: receiving a neural network of an original controller for controlling the robotic system based on a plurality of origin data samples from an origin domain and corresponding labels in a label space, the neural network of the original controller including a plurality of encoder parameters and a plurality of classifier parameters, the neural network being trained to: map an input data sample from the origin domain to a feature vector in a feature space in accordance with the encoder parameters; and assign a label of the label space to the input data sample based on the feature vector in accordance with the classifier parameters; updating the encoder parameters to minimize a dissimilarity, in the feature space, between: a plurality of origin feature vectors computed from the origin data samples; and a plurality of target feature vectors computed from a plurality of target data samples from the target domain, the target data samples having a smaller cardinality than the origin data samples; and updating the controller with the updated encoder parameters to control the robotic system in the target domain.

The dissimilarity may be computed in accordance with a sliced Wasserstein distance between the origin feature vectors in the feature space and the target feature vectors in the feature space.

The updating the encoder parameters may include iteratively computing a plurality of intermediate encoder parameters, each iteration including: computing the origin feature vectors in the feature space; computing the target feature vectors in the feature space in accordance with the intermediate encoder parameters; computing the dissimilarity between the origin feature vectors and the target feature vectors; updating the intermediate encoder parameters to reduce the dissimilarity between the origin feature vectors and the target feature vectors; determining whether the dissimilarity is minimized; in response to determining that the dissimilarity is not minimized, proceeding with another iteration with the updated intermediate encoder parameters as the intermediate encoder parameters; and in response to determining that the dissimilarity is minimized, outputting the intermediate encoder parameters as the updated encoder parameters.

The dissimilarity may be computed in accordance with a sliced Wasserstein distance between the origin feature vectors in the feature space and the target feature vectors in the feature space.

The computing the origin feature vectors may be performed by an origin encoder.

The computing the origin feature vectors may be performed in accordance with the intermediate encoder parameters.

The target data samples may include a plurality of target samples and a plurality of corresponding target labels.

The target data samples may include a plurality of unlabeled target samples.

The updating the encoder parameters may include iteratively computing a plurality of intermediate encoder parameters, each iteration including: computing the origin feature vectors in the feature space in accordance with the intermediate encoder parameters; computing the target feature vectors in the feature space in accordance with the intermediate encoder parameters; computing predicted labels for the target feature vectors in accordance with the classifier parameters, each of the predicted labels being associated with a confidence; defining a plurality of pseudo-labels corresponding to the predicted labels having confidences exceeding a threshold; updating the intermediate encoder parameters based on at least one of: minimizing a dissimilarity between the origin feature vectors and the target feature vectors; and minimizing a classification loss of the origin data samples; determining whether a stopping condition has been met, wherein the stopping condition may include at least one of: a dissimilarity between the origin feature vectors and the target feature vectors; and a saturation of a number of the pseudo-labels between iterations; in response to determining that the stopping condition has not been met, proceeding with another iteration with the updated intermediate encoder parameters as the intermediate encoder parameters; and in response to determining that the stopping condition is met, outputting the intermediate encoder parameters as the updated encoder parameters.

The updating the intermediate encoder parameters may alternate between: the minimizing the dissimilarity between the origin feature vectors and the target feature vectors; and the minimizing the classification loss of the origin data samples.

The neural network may include a convolutional neural network, a recurrent neural network, a capsule network, or combinations thereof.

According to one embodiment of the present invention, a system for training a controller to control a robotic system in a target domain includes: a processor; and memory storing instructions that, when executed by the processor, cause the processor to: receive a neural network of an original controller for controlling the robotic system based on a plurality of origin data samples from an origin domain and corresponding labels in a label space, the neural network of the original controller may include a plurality of encoder parameters and a plurality of classifier parameters, the neural network being trained to: map an input data sample from the origin domain to a feature vector in a feature space in accordance with the encoder parameters; and assign a label of the label space to the input data sample based on the feature vector in accordance with the classifier parameters; update the encoder parameters to minimize a dissimilarity between: a plurality of origin feature vectors computed from the origin data samples; and a plurality of target feature vectors computed from a plurality of target data samples from the target domain, the target data samples having a smaller cardinality than the origin data samples; and update the controller with the updated encoder parameters to control the robotic system in the target domain.

The dissimilarity may be computed in accordance with a sliced Wasserstein distance between the origin feature vectors in the feature space and the target feature vectors in the feature space.

The instructions that cause the processor to update the encoder parameters may include instructions that, when executed by the processor cause the processor to iteratively compute a plurality of intermediate encoder parameters, each iteration including: computing the origin feature vectors in the feature space; computing the target feature vectors in the feature space in accordance with the intermediate encoder parameters; computing the dissimilarity between the origin feature vectors and the target feature vectors; updating the intermediate encoder parameters to reduce the dissimilarity between the origin feature vectors and the target feature vectors; determining whether the dissimilarity is minimized; in response to determining that the dissimilarity is not minimized, proceeding with another iteration with the updated intermediate encoder parameters as the intermediate encoder parameters; and in response to determining that the dissimilarity is minimized, outputting the intermediate encoder parameters as the updated encoder parameters.

The dissimilarity may be computed in accordance with a sliced Wasserstein distance between the origin feature vectors in the feature space and the target feature vectors in the feature space.

The origin feature vectors may be computed in accordance with the encoder parameters.

The origin feature vectors may be computed in accordance with the intermediate encoder parameters.

The target data samples may include a plurality of target samples and a plurality of corresponding target labels.

The target data samples may include a plurality of unlabeled target samples.

The instructions that cause the processor to update the encoder parameters may include instructions that, when executed by the processor, cause the processor to compute the updated encoder parameters by iteratively computing a plurality of intermediate encoder parameters, each iteration including: computing the origin feature vectors in the feature space in accordance with the intermediate encoder parameters; computing the target feature vectors in the feature space in accordance with the intermediate encoder parameters; computing predicted labels for the target feature vectors in accordance with the classifier parameters, each of the predicted labels being associated with a confidence; defining a plurality of pseudo-labels corresponding to the predicted labels having confidences exceeding a threshold; updating the intermediate encoder parameters based on at least one of: minimizing a dissimilarity between the origin feature vectors and the target feature vectors; and minimizing a classification loss of the origin data samples; determining whether a stopping condition has been met, wherein the stopping condition may include at least one of: a dissimilarity between the origin feature vectors and the target feature vectors; and a saturation of a number of the pseudo-labels between iterations; in response to determining that the stopping condition has not been met, proceeding with another iteration with the updated intermediate encoder parameters as the intermediate encoder parameters; and in response to determining that the stopping condition is met, outputting the intermediate encoder parameters as the updated encoder parameters.

The updating the intermediate encoder parameters may alternate between: the minimizing the dissimilarity between the origin feature vectors and the target feature vectors; and the minimizing a classification loss of the origin data samples.

The neural network may include a convolutional neural network, a recurrent neural network, a capsule network, or combinations thereof.

According to one embodiment of the present invention, a non-transitory computer readable medium has instructions stored thereon that, when executed by a processor, cause the processor to: receive a neural network of an original controller for controlling a robotic system based on a plurality of origin data samples from an origin domain and corresponding labels in a label space, the neural network of the original controller comprising a plurality of encoder parameters and a plurality of classifier parameters, the neural network being trained to: map an input data sample from the origin domain to a feature vector in a feature space in accordance with the encoder parameters; and assign a label of the label space to the input data sample based on the feature vector in accordance with the classifier parameters; update the encoder parameters to minimize a dissimilarity between: a plurality of origin feature vectors computed from the origin data samples; and a plurality of target feature vectors computed from a plurality of target data samples from a target domain, the target data samples having a smaller cardinality than the origin data samples; and update the controller with the updated encoder parameters to control a robotic system in the target domain.

The dissimilarity may be computed in accordance with a sliced Wasserstein distance between the origin feature vectors in the feature space and the target feature vectors in the feature space.

The instructions that cause the processor to update the encoder parameters may include instructions that, when executed by the processor cause the processor to iteratively compute a plurality of intermediate encoder parameters, each iteration including: computing the origin feature vectors in the feature space; computing the target feature vectors in the feature space in accordance with the intermediate encoder parameters; computing the dissimilarity between the origin feature vectors and the target feature vectors; updating the intermediate encoder parameters to reduce the dissimilarity between the origin feature vectors and the target feature vectors; determining whether the dissimilarity is minimized; in response to determining that the dissimilarity is not minimized, proceeding with another iteration with the updated intermediate encoder parameters as the intermediate encoder parameters; and in response to determining that the dissimilarity is minimized, outputting the intermediate encoder parameters as the updated encoder parameters.

The dissimilarity may be computed in accordance with a sliced Wasserstein distance between the origin feature vectors in the feature space and the target feature vectors in the feature space.

The origin feature vectors may be computed in accordance with the encoder parameters.

The origin feature vectors may be computed in accordance with the intermediate encoder parameters.

The target data samples may include a plurality of target samples and a plurality of corresponding target labels.

The target data samples may include a plurality of unlabeled target samples.

The instructions that cause the processor to update the encoder parameters may include instructions that, when executed by the processor, cause the processor to compute the updated encoder parameters by iteratively computing a plurality of intermediate encoder parameters, each iteration including: computing the origin feature vectors in the feature space in accordance with the intermediate encoder parameters; computing the target feature vectors in the feature space in accordance with the intermediate encoder parameters; computing predicted labels for the target feature vectors using the classifier parameters, each of the predicted labels being associated with a confidence; defining a plurality of pseudo-labels corresponding to the predicted labels having confidences exceeding a threshold; updating the intermediate encoder parameters based on at least one of: minimizing a dissimilarity between the origin feature vectors and the target feature vectors; and minimizing a classification loss of the origin data samples; determining whether a stopping condition has been met, wherein the stopping condition m include at least one of: a dissimilarity between the origin feature vectors and the target feature vectors; and a saturation of a number of the pseudo-labels between iterations; in response to determining that the stopping condition has not been met, proceeding with another iteration with the updated intermediate encoder parameters as the intermediate encoder parameters; and in response to determining that the stopping condition is met, outputting the intermediate encoder parameters as the updated encoder parameters.

The updating the intermediate encoder parameters may alternate between: the minimizing the dissimilarity between the origin feature vectors and the target feature vectors; and the minimizing the classification loss of the origin data samples.

The neural network may include a convolutional neural network, a recurrent neural network, a capsule network, or combinations thereof.

BRIEF DESCRIPTION OF THE DRAWINGS

The accompanying drawings, together with the specification, illustrate exemplary embodiments of the present invention, and, together with the description, serve to explain the principles of the present invention.

FIGS. 4A, 4B, 4C, and 4D are illustrations of the slicing and empirical calculation of the sliced-Wasserstein distance according to one embodiment of the present invention.

FIGS. 5A and 5B are a schematic illustration of the learning of encoding function $\phi$ (or learning of encoder parameters of the encoding function) based on labeled samples from a first domain (Domain A, Modified National Institute of Standards and Technology or MNIST) and the update of encoding function $\phi$ (or update of the encoder parameters) to compute encoding function $\psi$ based on data from a second domain (Street View House Numbers or SVHN) in accordance with one embodiment of the present invention.

DETAILED DESCRIPTION

Figure 1A:
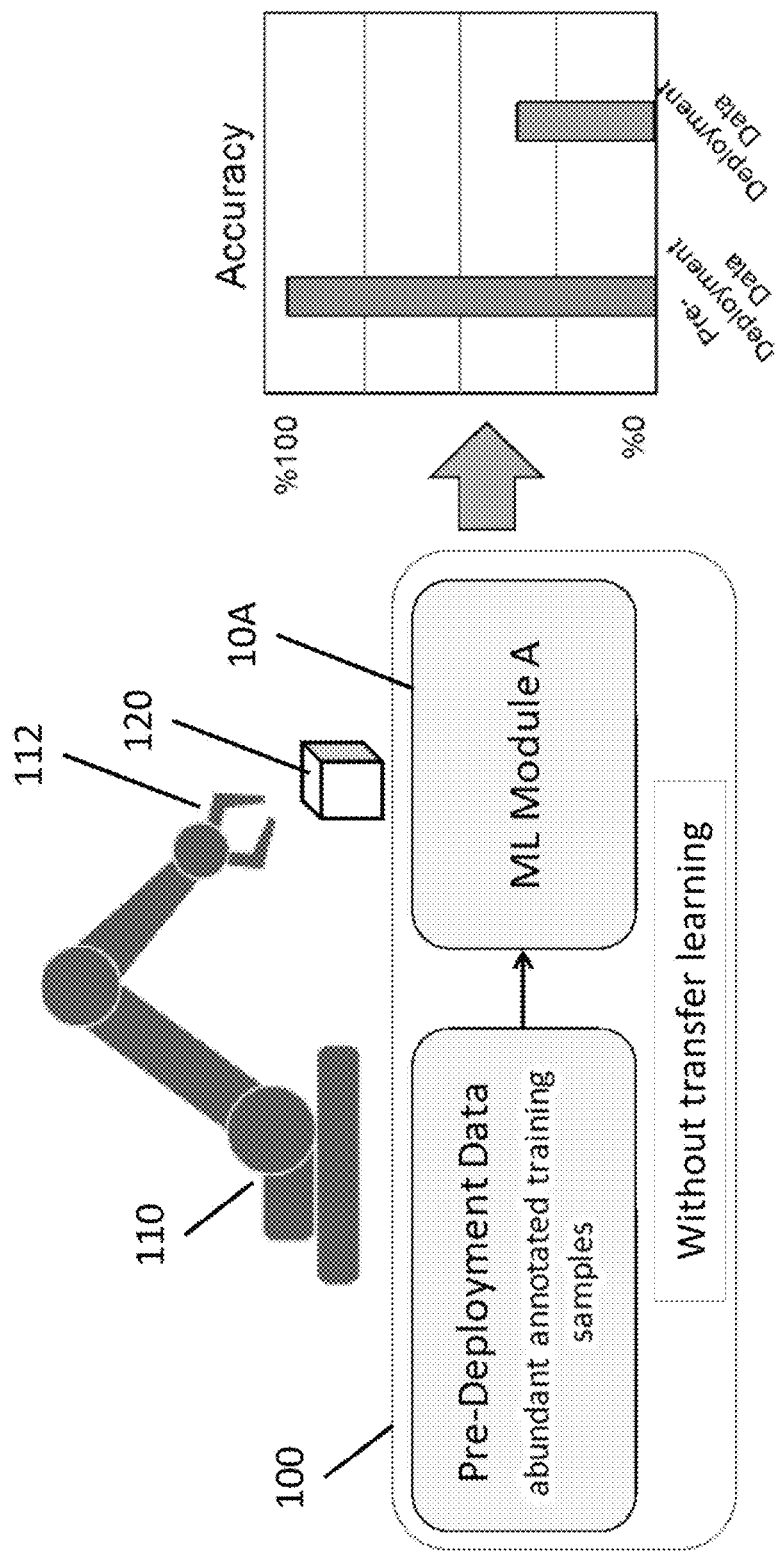
FIGS. 1A and 1B are schematic illustrations of a machine learning module trained based on labeled samples taken from a first domain or origin domain (e.g., a trained robot) and its performance on samples taken from the first domain and a second domain or target domain (e.g., an untrained robot) different from the first domain.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention relate to systems and methods for leveraging previously learned models (e.g., models trained based on prior knowledge from one domain, which may be referred to herein as an "origin" domain or a "source" domain $\mathcal{D}_S$) to learn new tasks (e.g., adapting the models based on new data from a new or different domain, which may be referred to herein as a "target" domain $\mathcal{D}_T$). Some aspects of embodiments of the present invention relate to systems and methods for learning the new tasks based on a small number (e.g., on the order of tens) of samples from the target domain. One aspect of embodiments of the present invention relates to a method for transfer learning that leverages an origin or a source dataset with many labeled samples (e.g., a synthetic dataset where labels are readily available at essentially no additional cost) that was used to learn a model to perform a task (such as object classification, robotic manipulation, or autonomous navigation) and modifies the model to perform the task on a new target dataset with only few labeled samples (e.g., a real-world dataset with a handful of labels from costly ground truth data such as manually labeled data). One aspect of embodiments of the present invention relates to generating pseudo-labels in circumstances where the samples from the new or different domain are unlabeled.

According to some aspects of embodiments of the present invention, the system includes two modules, namely: 1) Machine Learning Module A 10A, which is a fully trained machine learning module (using many labeled samples from the origin or source domain), and 2) Machine Learning Module B 10B, which is required to learn a task that is different from, but related to, the task of Module A 10A, but with only few labeled samples or a few unlabeled samples from the target domain. As one example, to be described in more detail below, Machine Learning Module A 10A may be trained to recognize digits in images of handwritten numbers (the origin or source domain), and Machine Learning Module B 10B may be required to recognize digits in images of printed street numbers (the target domain) through an update or retraining of Module A 10A through a few examples from the target domain (e.g., a few images of street numbers). Note that, while the inputs differ, the outputs of these two classifications are the same; that is, both Machine Learning Module A 10A and Machine Learning Module B 10B output classifications of the input images as representing one of the digits from 0 to 9.

Aspects of embodiments of the present invention may be applied in a variety of contexts, such as where learning from a few samples is beneficial for efficient machine learning of an autonomous system that can be widely used under various environmental conditions or different sensor modalities. Examples of potential applications include, but are not limited to, autonomous driving (e.g., training a controller for a self-driving vehicle to operate in one locality, and applying transfer learning to update the controller to operate a self-driving vehicle in a different locality having different weather, different traffic patterns, and/or different traffic laws); Intelligence, Surveillance and Reconnaissance (ISR); and robotic manipulation.

As one concrete example, some embodiments of the present invention may be applied to a robotic manipulation system that is configured to reach and grab different objects. FIGS. 1A, 1B, 2A, and 2B illustrate one embodiment of the present invention in the context of a robotic arm system.

The robotic system is required to first detect and localize an object, and then reach for it. Such robotic system is trained before deployment to grab simple objects (e.g., regular, rectangular objects). As shown in FIG. 1A, a system or controller 100 for controlling a robotic system including a robotic arm 110 may include a Machine Learning Module A (ML Module A) 10A that includes a model (e.g., a neural network) trained based on a large collection of data $X_S$ from domain $\mathcal{X}_S$ ("pre-deployment data" or origin domain) and labels $Y_S$ from an original domain $\mathcal{D}_S$ (or first domain or origin domain) where labeled training samples are abundant and readily available. These pre-deployment data $X_S$ may be, for example, collected from tasks in an original domain (or origin domain) of application for the robotic arm system 100 (e.g., manipulating regular, rectangular boxes 120) and may also include, for example, data automatically generated or synthesized based on simulations of the environment experienced by the robotic arm system 110.

Figure 1B:
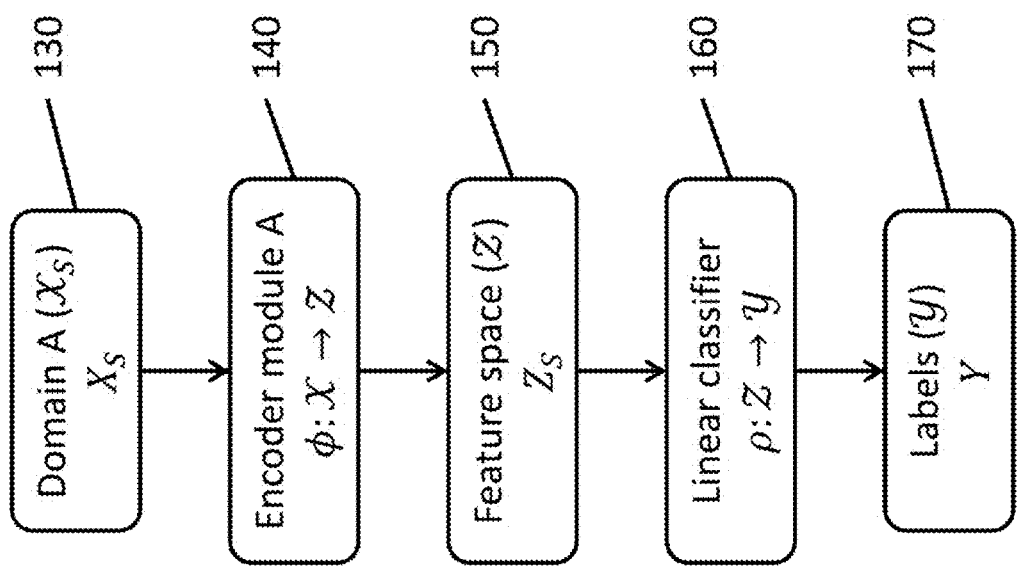

FIG. 1B is a schematic illustration of the use of a trained Machine Learning Module A 10A for "inference." In particular, the trained Machine Learning Module A 10A may be considered as including an encoder $\phi$ 140 and a linear classifier $\rho$ 160. The encoder $\phi$ 140 is a function that maps data $X_S$ 130 from Domain A ($\mathcal{X}_S$) to values (or features) $Z_S$ 150 in latent space $\mathcal{Z}$ (or feature space), and the encoder $\phi$ 140 may perform the mapping in accordance with a plurality of encoder parameters. The linear classifier $\rho$ 160 is a function that maps from the feature space or latent space $\mathcal{Z}$ to class labels Y in label space $\mathcal{Y}$, and the classifier may perform the classification (or assignment of a class label or, more generally, an assignment scores to different ones of the class labels) in accordance with a plurality of classifier parameters. More concretely, for example, the data $X_S$ may correspond to particular conditions detected by the robotic arm of regular, rectangular boxes (e.g., size, shape, and orientation), and the labels Y may correspond to various combinations of movements (e.g., rotations and translations) of the robotic arm system 110 to move the claw 112 to grasp the box 120.

On the other hand, in the deployment environment (or a target domain), the robotic arm system may be required to detect objects with a more complex appearance (e.g., soft bags, children's toys, shoes, and the like). As shown in FIG. 1A, while such a trained Machine Learning Module A 10A exhibits high accuracy (over 90%) in the original ("pre-deployment" or "origin") domain $\mathcal{X}_S$, the actual conditions encountered by the deployed system (e.g., in a second domain or "target" domain corresponding to real-world use in the field) may be significantly different from the domain of the pre-deployment data. Accordingly, the performance of the system may be relatively poor in deployment, such as having an accuracy far below 50%, as shown in FIG. 1A.

Accordingly, some aspects of embodiments of the present invention relate to systems and methods for reconfiguring a previously trained model (e.g., of the robotic arm system) to learn a modified or new task (grabbing objects that were never seen during the initial training process).

Figure 2A:
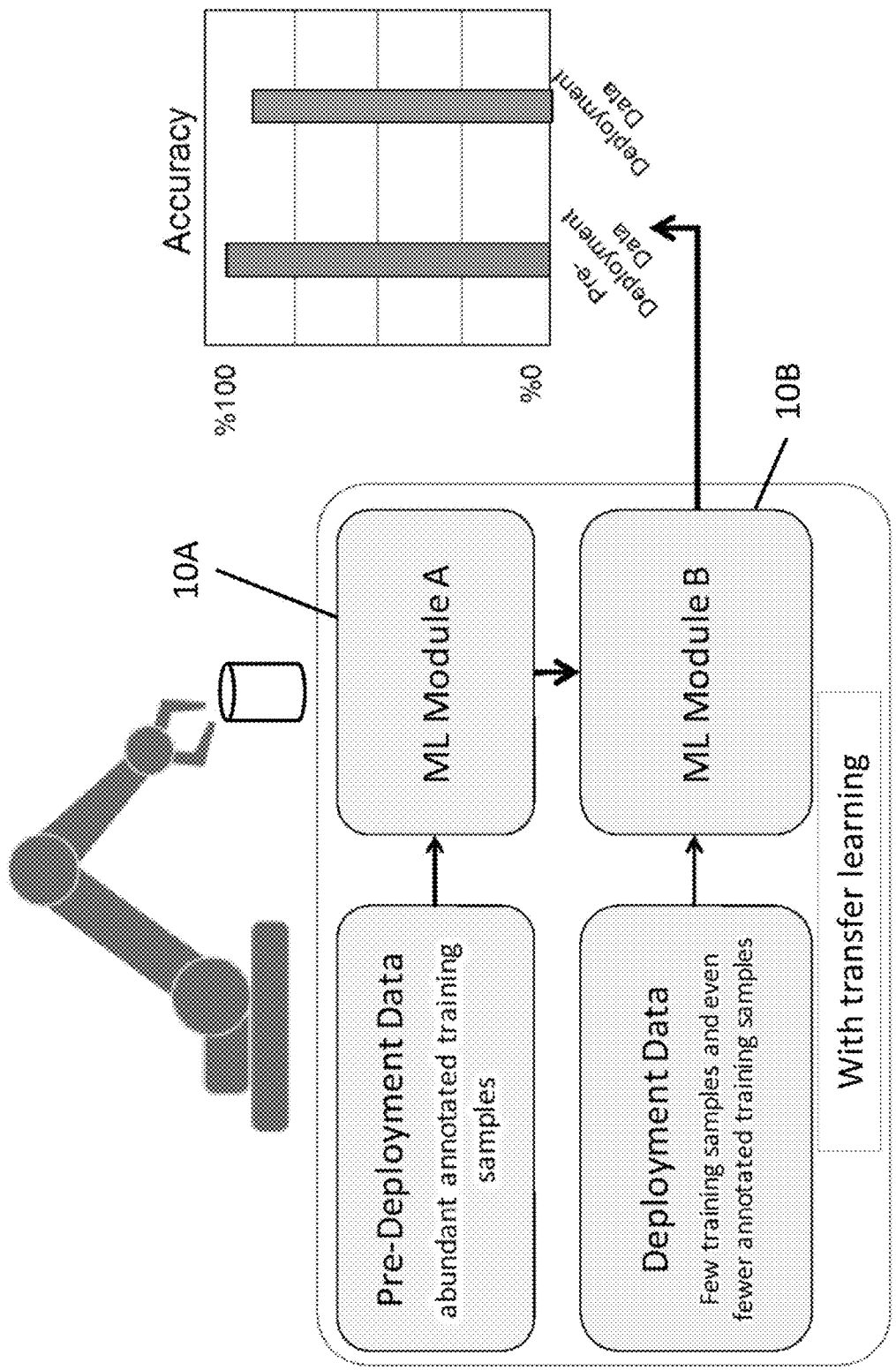
FIGS. 2A and 2B are schematic illustrations of a machine learning module trained based on labeled samples taken from a first domain (or origin domain) and updated based on a few samples from a second domain (or target domain) different from the first domain, along with the performance of the updated machine learning module in the first domain (e.g., a trained robot) and the second domain (e.g., an untrained robot).
Figure 2B:
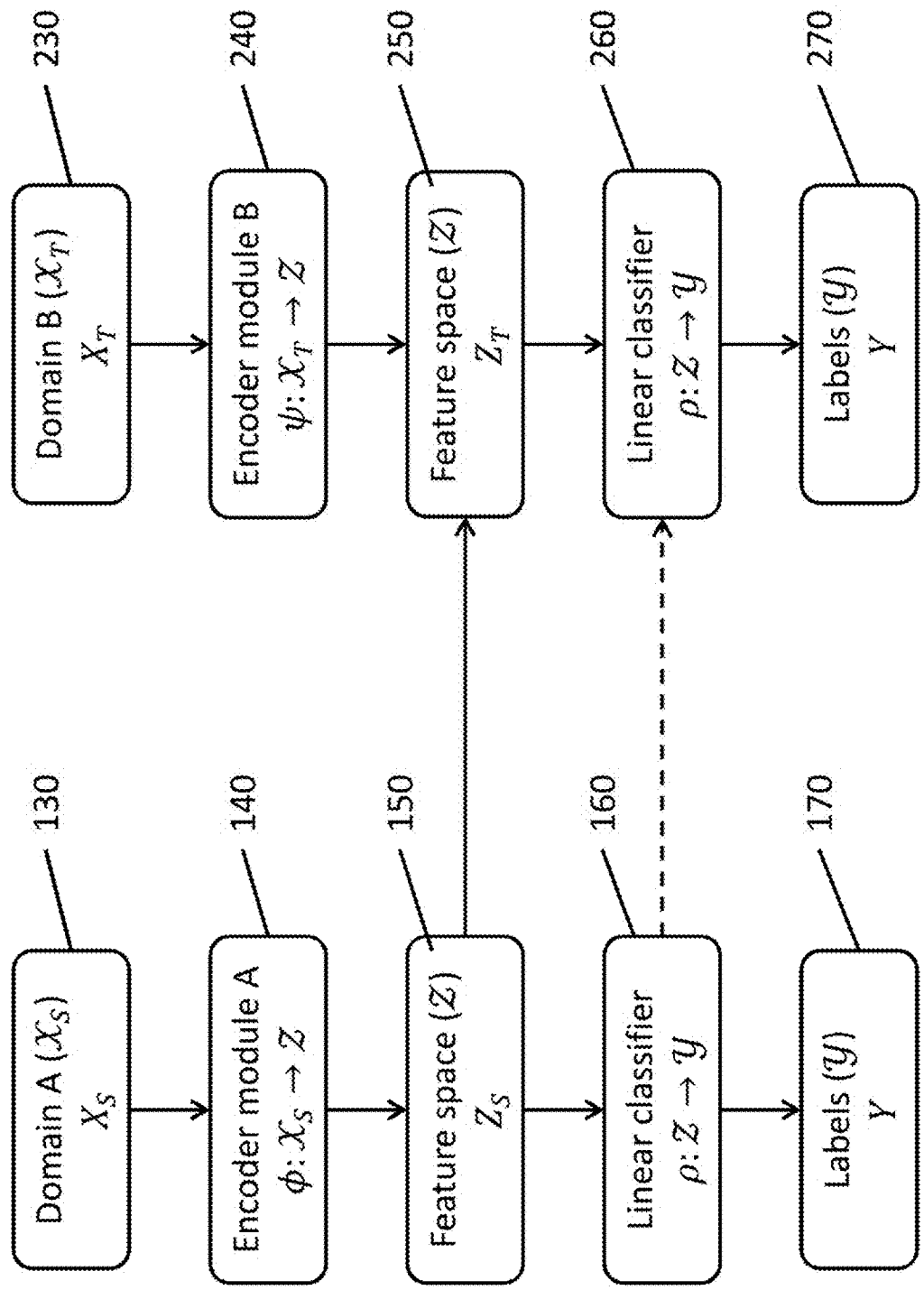

As shown in FIGS. 2A and 2B, applying transfer learning in accordance with embodiments of the present invention, the original trained Machine Learning Module A 10A may be modified or updated based on "deployment data" $X_T$ from the deployment domain $\mathcal{D}_T$ (or second domain or target domain) to generate an updated trained Machine Learning Module B 10B (ML Module B). As shown in FIG. 2A, the updated ML Module B 10B achieves significantly better performance (e.g., above 80%) in the second domain $\mathcal{D}_T$, while maintaining high performance in the first domain of the original, pre-deployment domain $\mathcal{D}_S$. In many instances, it may be relatively difficult to obtain a large amount of data in the second domain $\mathcal{D}_T$ (the deployment domain or target domain). For example, in the case of a robotic manipulation system, new, labeled samples may be generated through human intervention in the behavior of the system, which may require significant effort by one or more skilled human operators. The scarcity of data in the second domain makes it infeasible to train a model directly from this deployment data.

As such, some aspects of embodiments of the present invention relate to using a relatively small collection of deployment data (e.g., on the order of tens of samples) to update the previously trained ML Module A 10A to generate an ML Module B 10B capable of accurately performing tasks (e.g., classifying observed conditions to compute a behavior) in both the first domain and the second domain.

As shown in FIG. 2B, in one embodiment, the originally trained Machine Learning Module A 10A is used to generate the updated Machine Learning Module B 10B. In some embodiments, a new encoder $\psi$ 240 is learned in the Machine Learning Module B 10B, where the new encoder function $\psi$ 240 maps data $X_T$ 230 from the new Domain B (or $\mathcal{X}_T$) to values (or feature vectors) $Z_T$ 250 in the feature latent space $\mathcal{Z}$. In some embodiments, the same classifier $\rho$ 160 from the Machine Learning Module A 10A is reused for classifying features (or feature vectors) $Z_T$ extracted from the target domain $\mathcal{X}_T$. In some embodiments, a new linear classifier $\rho'$ 260 is trained to compute the labels $Y_T$ 270 for the new data $X_T$ from the features $Z_T$ in the latent (or feature) space $\mathcal{Z}$.

Accordingly, some aspects of embodiments of the present invention relate to systems and methods for learning a shared encoder $\psi$ that is applicable to both the original domain (pre-deployment or "origin" or "source" domain $\mathcal{D}_S$) and the deployment domain (or "target" domain $\mathcal{D}_T$). In some embodiments of the present invention, different encoders $\phi$ and $\psi$ are trained for the origin or source domain $\mathcal{D}_S$ and the target domain $\mathcal{D}_T$. As discussed in more detail below, according to some embodiments, this is achieved by minimizing a distance between the target and the source (or "origin") distributions in the latent (or feature) space $\mathcal{Z}$ (or embedding space), while concurrently training a classifier network $\rho$ 260 using the source (or origin) domain data $X_S$—in other words, minimizing the distance between the origin feature vectors $\phi(X_S)$ and the target feature vectors $\psi(X_T)$. In some embodiments, this distance is a sliced-Wasserstein distance (SWD) (see, e.g., Kolouri, Soheil, Yang Zou, and Gustavo K. Rohde. "Sliced Wasserstein kernels for probability distributions." *Proceedings of the IEEE Conference on Computer Vision and Pattern Recognition*. 2016), as discussed in more detail below.

Figure 3:
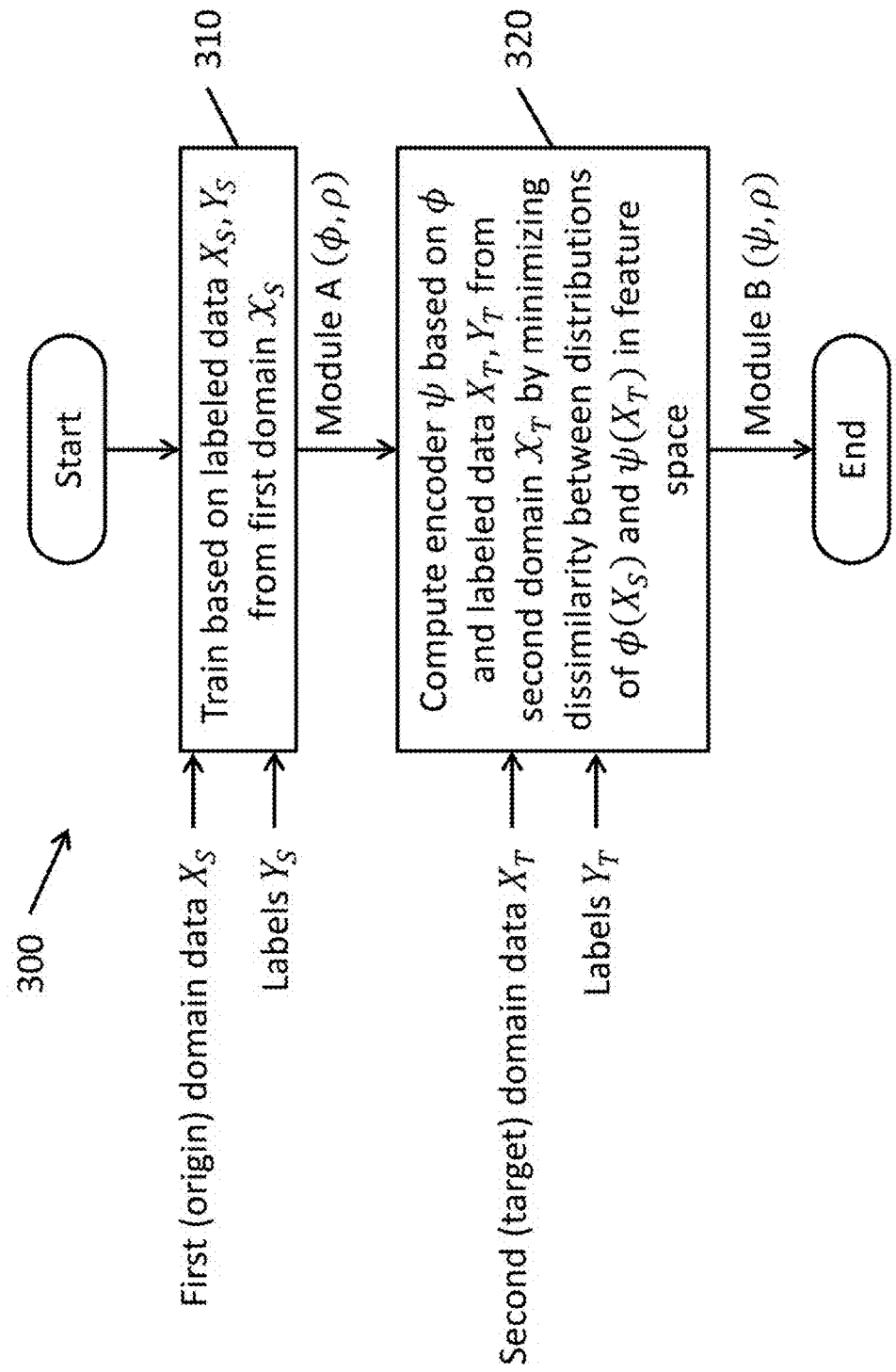
FIG. 3 is a flowchart of a method for training a machine learning module based on data from a first domain (or origin domain) and updating the module based on a few labeled data points from a second domain (or target domain) in accordance with one embodiment of the present invention.

FIG. 3 is a flowchart of a method for training a machine learning module based on data from a first domain and updating the module based on a few labeled data points from a second domain in accordance with one embodiment of the present invention. The training of the machine learning module may be performed by a model training system. As will be described in more detail below, the model training system may include one or more computing devices. In some embodiments, the computing devices include one or more processors and memory, where the memory may store, for example, training data, trained models, and intermediate data generated during the training of the models. The one or more processors may include, for example, a central processing unit, a graphical processing unit (GPU) or other vector processor, a neuromorphic circuit, and/or a field programmable gate array (FPGA). The memory may include dynamic random access memory (DRAM), static random access memory (SRAM), and persistent mass storage (e.g., hard drives and/or flash memory).

As shown in FIG. 3, in operation 310, a model training system trains a first module (Module A) based on the abundant data X from domain A. For the sake of convenience of discussion, the training data from the first domain $\mathcal{D}_S$ (or source domain or origin domain or pre-deployment domain) may be represented as $X=[x_1, \ldots, x_N] \in \mathbb{R}^{d \times N}$ and corresponding labels in label space may be represented as $Y=[y_i, \ldots, y_N] \in \mathbb{R}^{K \times N}$ where each sample $x_i$ can be labeled with one or more of K possible categories or classifications (in other words, $y_i$ may be represented as a K dimensional vector, and each of the K values of the vector may fall within a range such as [0, 1], where the value represents a confidence of a particular classification). The training in operation 310 may be performed using standard machine learning techniques (e.g., back-propagation and gradient descent) to compute parameters configuring the model (e.g., encoder parameters and classifier parameters of a neural network that includes an encoder and a classifier, where the parameters may include weights and biases of the connections between layers of neurons of the neural network).

As noted above, an encoder module $\phi$ 140 provides a parametric mapping from samples X to a latent space (or feature space) $\mathcal{Z}$, $\phi: \mathcal{X} \to \mathcal{Z}$. In some embodiments of the present invention, the encoder module is implemented using a neural network. In various embodiments, the neural network is a convolutional neural network, a recurrent neural network, a hybrid of a convolutional neural network and a recurrent neural network, a capsule network, etc. Also, as noted above, a linear classifier $\rho$ 160 maps values (or feature vectors) from the latent space (or feature space) $\mathcal{Z}$ to the labels Y in label space $\mathcal{Y}$, $\rho: \mathcal{Z} \to \mathcal{Y}$. The composition of $\phi$ and $\rho$ defines a function that maps samples, X, to the labels, Y, $\rho(\phi(\cdot)): \mathcal{X} \to \mathcal{Y}$. In some embodiments, the functions $\phi$ and $\rho$ are trained (e.g., end-to-end trained) using back-propagation (see, e.g., Hagan, M. T. and Menhaj, M. B., 1994. "Training feedforward networks with the Marquardt algorithm." *IEEE transactions on Neural Networks*, 5(6), pp. 989-993 and LeCun, Yann, et al. "Backpropagation applied to handwritten zip code recognition." *Neural computation* 1.4 (1989): 541-551). For example, the training process computes a plurality of encoder parameters configuring behavior of the encoder ϕ, and a plurality of classifier parameters configuring the behavior of the classifier ρ. However, embodiments of the resent invention are not limited thereto and other techniques such as evolutionary algorithms may be used instead. The encoder module ϕ 140 can be viewed as capturing the nonlinearities in the sample space $\mathcal{X}$ by extracting useful features from the dataset X, such that the mapping between the latent (or feature) space $\mathcal{Z}$ and the label space $\mathcal{Y}$ can be modeled as being linear, thereby enabling use of a linear classifier ρ:$\mathcal{Z} \to \mathcal{Y}$ 160. These trained modules are shown, for example, in FIG. 1B.

During deployment, the trained model is expected to map the newly observed data $X_T=[x_1^T, \ldots, x_M^T] \in R^{l \times M}$ m to class labels $Y'=[y_1^T, \ldots, y_M^T] \in R^{K \times M}$. However, the distribution of the newly observed data $X_T$ sampled from a new domain $\mathcal{D}_T$ (a second domain or target domain or Domain B) may be somewhat different from the domain $\mathcal{D}_S$ of the training data $X_S$, $Y_S$, and, therefore, the previously learned mapping ϕ:$\mathcal{X} \to \mathcal{Z}$ may not provide sensible feature extraction from the target domain $\mathcal{D}_T$ (e.g., applying 4 to values $X_T$ from $\mathcal{X}_T$ might not lead to sensible inputs to ρ to compute labels $Y_T$ for $X_T$). In addition, in some embodiments, the model training system may not have access to a large pool of labeled data from the new domain (e.g., the number of samples or cardinality M of the target training data is much smaller than the number of samples or cardinality N of the source or "origin" training data: M<<N). Accordingly, aspects of embodiments of the present invention relate to automatically adapting or updating the trained models (e.g., updating the encoder parameters), in operation 320, to the newly observed data from the new domain by considering a few labeled samples $X_T$, $Y_T$ (e.g., tens of samples).

According to one embodiment of the present invention, the second encoder ψ 240 of the module B 10B, described above with respect to FIG. 2B as computing a mapping ψ: $\mathcal{X}_T \to \mathcal{Z}_T$, is used to extract features (or feature vectors) from the new data $X_T$. In various embodiments of the present invention, the second encoder module B may be, for example, a neural network (such as a convolutional neural network, a recurrent neural network, a hybrid of a convolutional neural network with a recurrent neural network, a capsule network, and the like). The learned linear classifier ρ:$\mathcal{Z} \to \mathcal{Y}$ may also be refurbished (e.g., to compute a new linear classifier ρ') to define the mapping between Z' and Y' (e.g., updating the classifier parameters). However, because the number of samples X' from the second domain $\mathcal{D}_T$ (target domain or Domain B) is assumed to be small, it may be difficult or impossible to learn the parameters of ψ (e.g., the weights of the connections of the neural network) directly from the new samples $X_T$ alone using a technique such as backpropagation.

Therefore, some aspects of embodiments of the present invention relate to automatically learning, in operation 320, the encoding parameters of an encoding function ϕ (e.g., learning the weights of a neural network) to map samples $X_S$ from the original, pre-deployment domain $\mathcal{D}_S$ (e.g., source domain or origin domain or Domain A) and encoder ψ that maps samples $X_T$ from the new, post-deployment domain $\mathcal{D}_T$ (e.g., target domain or Domain B) to the same latent space (or feature space) $\mathcal{Z}$ In various embodiments, ϕ and ψ are the same or different encoders. If the distance between the distributions of the training data ϕ($X_S$) (or origin feature vectors) and the distribution of the observed data (or target feature vectors) ψ($X_T$) in the latent space (or feature space)

$\mathcal{Z}$ is small, then the same classifier ρ can be used to classify samples from both domains (samples from $\mathcal{X}_S$ and $\mathcal{X}_T$). In particular, the parameters of the encoder module B 1 may be calculated in accordance with Equation 1:

$$\mathrm{argmin}_\psi \underbrace{D(p(\phi(X_S)), p(\psi(X_T)))}_{\text{Unsupervised}} + \lambda \underbrace{\sum_k D(p(\phi(X_S) \mid C_k), p(\psi(X_T) \mid C_k))}_{\text{Supervised(Class specific)}}.$$

In other words, by minimizing the loss function provided as input to $\mathrm{argmin}_\psi$, where D is a dissimilarity measure between distributions, the first term D (p(ϕ($X_S$)),p(ψ($X_T$))) enforces the probability distribution (p(·)) of all projected data points p(ψ($X_T$)) to match that of the training samples p(ϕ($X_S$)) where no class information is used, the second term $\Sigma_k$ D(p(ϕ($X_S$)|$C_k$), p(ψ($X_T$)|$C_k$)) enforces the class-specific distribution $C_k$ of the few labeled samples, p(ψ($X_T$)|$C_k$), to match the distribution of the corresponding class in the training set, p(ϕ($X_S$)|$C_k$), and λ is a regularization parameter. Note that the first term carries no class information C and hence is an unsupervised loss function, while the second term does include class information and therefore is a supervised loss function. As such, in circumstances where ϕ and ψ share parameters, the encoder ψ is learned (e.g., the encoder parameters are calculated or learned) using data points from both domains (samples $X_S$ and $X_T$ from the source (or "origin") and target domains, respectively) and the classifier is concurrently learned (e.g., the classifier parameters are calculated or learned) using labeled data $Y_S$ from the source (pre-deployment or origin) domain $\mathcal{D}_S$ and labeled data $Y_T$ from the target domain $\mathcal{D}_T$.

In some embodiments of the present invention, the dissimilarity measure D is a sliced-Wasserstein distance. In related art, Kullback-Leibler (KL) divergence and related distance measures such as the Jensen-Shannon divergence have been used as measures of dissimilarity. However, such measures generally perform poorly when the distributions are supported on non-overlapping, low-dimensional manifolds.

Accordingly, some aspects of embodiments of the present invention relate to the use of a sliced-Wasserstein distance as a metric, which provides a more robust alternative to the metrics used in the related art. The idea behind the sliced-Wasserstein distance is to slice the high-dimensional distributions into their one-dimensional marginal distributions and measure the cumulative distance between their corresponding marginal distributions.

FIGS. 4A, 4B, 4C, and 4D demonstrate slicing of two two-dimensional distributions and the empirical calculation of the p-Wasserstein distance. The p-Wasserstein distance between two one-dimensional probability densities p is equal to the $\ell_p$ distance between the inverse of their cumulative distribution functions. More formally, the sliced-Wasserstein distance between d-dimensional samples in f-dimensional feature space $\mathcal{Z}$ :

$\{\phi(x_i^s) \in \mathbb{R}^f \sim p_S\}_{i=1}^M$ representing the source (or origin) distribution $p_S$ and $\{\psi(x_i^t) \in \mathbb{R}^f \sim p_T\}_{i=1}^M$ representing the target distribution $p_T$ is approximated as:

$$SW^2(p_S, p_T) \approx \sum_{l=1}^L \sum_{i=1}^M \left| \theta_l \cdot \phi(x_{s_l[i]}^s) - \theta_l \cdot \psi(x_{t_l[i]}^t) \right|^2$$

for $\theta_l \in \mathbb{S}^{f-1}$ as random samples from the unit $f$-dimensional ball, and where $s_l[i]$ and $t_l[i]$ are the sorted indices of $\{\theta_l \cdot \phi(x_i)\}_{i=1}^M$ for source (or "origin") and target domains, respectively.

Accordingly, Equation 1 above may be rewritten to replace the generic dissimiarity measure D with the sliced-Wasserstein distance ($SW_2^2$) to yield Equation 2:

$$\operatorname{argmin}_\psi SW_2^2(p(\phi(X)), p(\psi(X'))) + \lambda \sum_k SW_2^2(p(\phi(X) \mid C_k), p(\psi(X') \mid C_k))$$

where the sliced-Wasserstein between two m-dimensional distributions p and q is defined in Equation 3 as:

$$SW_2^2(p, q) = \int_{S^{m-1}} \int_R |RP(t, \theta) - RQ(t, \theta)|^2 dt d\theta$$

where $S^{m-1}$ is the unit sphere in the m-dimensional latent space, $RP(t, \theta)$ is the cumulative distribution of the marginal distribution $Rp(\cdot, \theta)$ defined in Equation 4 as:

$$RP(t, \theta) = \int_{-\infty}^t Rp(\tau, \theta) d\tau, \forall \theta \in S^{m-1}$$

and $RQ(\cdot, \theta)$ is defined similarly to $Rp(\cdot, \theta)$, and the marginal distribution $Rp(\cdot, \theta)$ (and, similarly, $Rq(\cdot, \theta)$) is defined in Equation 5 as:

$$Rp(t, \theta) = \int_X p(x) \delta(t - x \cdot \theta) dx, \forall \theta \in S^{m-1}, \forall t \in R$$

Figure 4A:
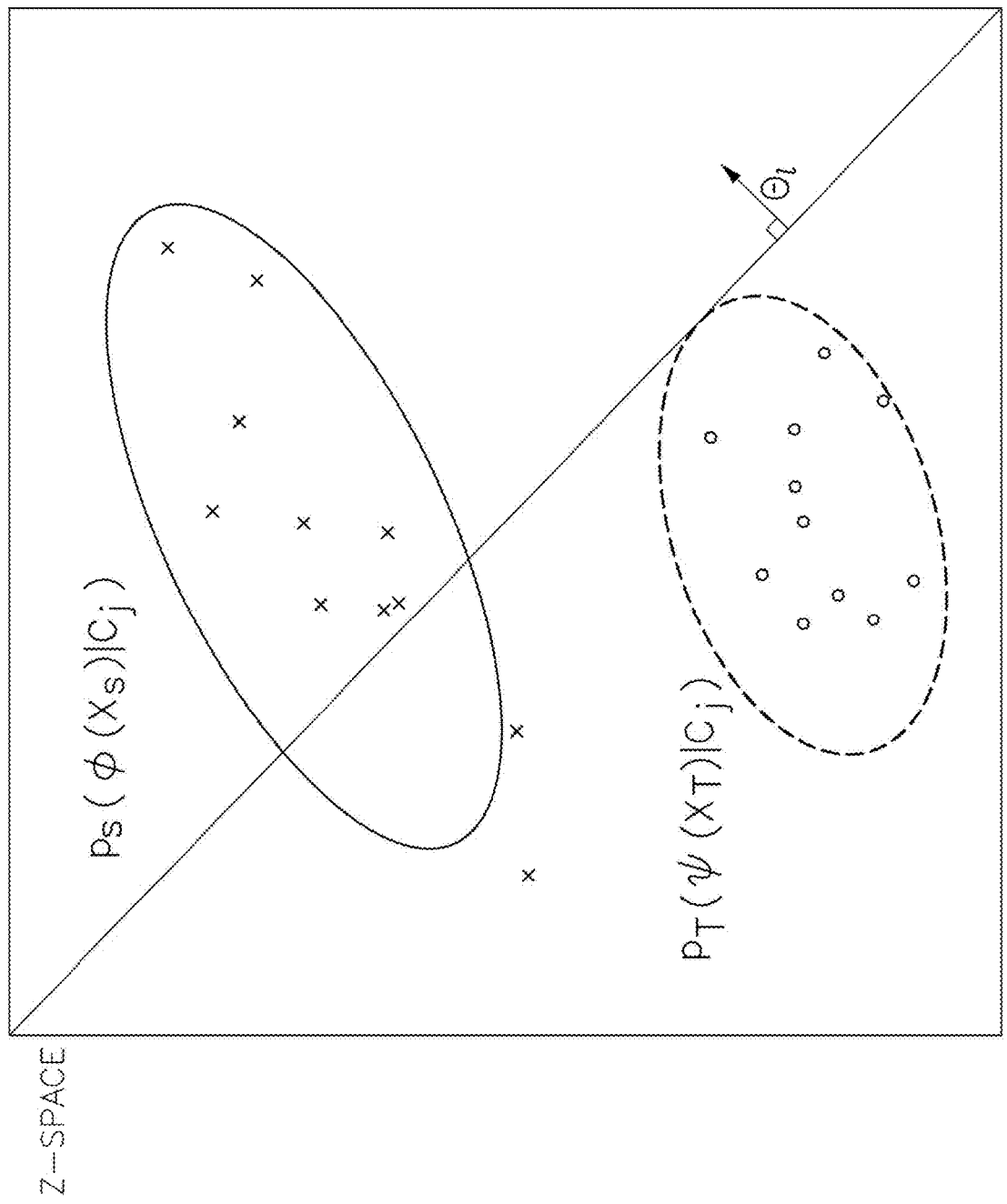

FIG. 4A depicts the distributions $p_S(\theta_l \cdot (X_S) \mid C_j)$ and $p_T(\theta_l \cdot \psi(X_T) \mid C_j)$ in Z-space in one illustrative example. Each of the individual dots represents feature vector extracted from a corresponding point in the data X by an encoder function (e.g., $\phi$ or $\psi$), and the ovals indicate the covariance of the Gaussian distributions. The line $\theta_l$ represents the subspace orthogonal to $\theta$.

FIG. 4B depicts the two m-dimensional distributions $p_S(\theta_l \cdot \phi(X_S) \mid C_j)$ and $p_T(\theta_l \cdot \psi(X_T) \mid C_j)$ in one illustrative example. FIG. 4C depicts the corresponding cumulative distributions $P_S(\theta_l \cdot \phi(X_S) \mid C_j)$ and $P_T(\theta_l \cdot (X_T) \mid C_j)$, with horizontal lines representing the distances between the cumulative distributions in one illustrative example.

In some embodiments, when the actual distributions of p and q are not available, the discrete approximations of Equations 3, 4, and 5 are used based on observed samples from the distributions. For example, when only samples from distributions are available, the p-Wasserstein distance can be approximated as the $\ell_p$ distance between the sorted samples (see, e.g., Hagan, M. T. and Menhaj, M. B., 1994. "Training feedforward networks with the Marquardt algorithm." *IEEE transactions on Neural Networks*, 5(6), pp. 989-993 and Kolouri, S.; Martin, C. E.; and Rohde, G. K. 2018. "Sliced-Wasserstein Autoencoder: An embarrassingly simple generative model." arXiv preprint arXiv:1804.01947). FIG. 4D depicts the $\ell_p$ distance between the sorted samples $\hat{P}_S$ and $\hat{P}_T$, where a few examples of the $\ell_p$ distances are shown with double headed arrows.

Figure 5A:
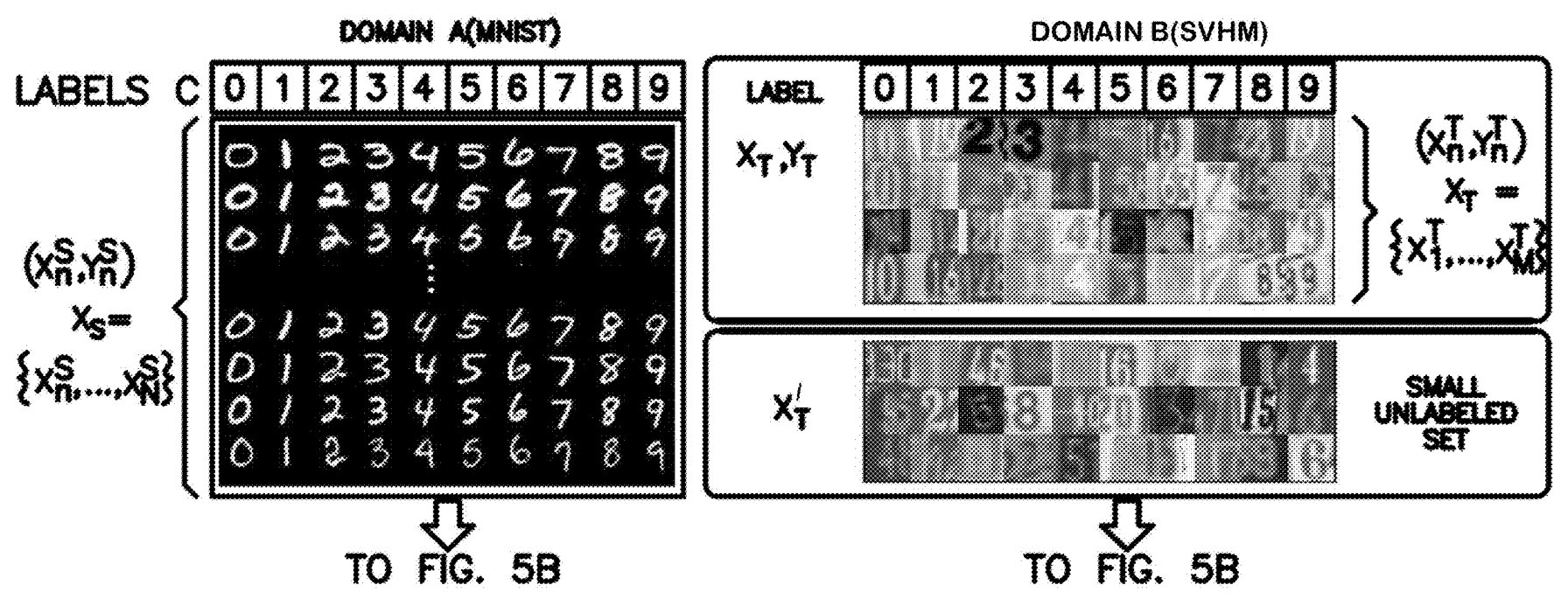

As one example of an application of embodiments of the present invention, a model initially trained to recognize digits based on images of handwritten digits is updated to recognize digits of images of printed digits (house numbers) based on a small sample of printed digits. FIGS. 5A and 5B are a schematic depiction of the learning of encoding function $\phi$ (or learning of encoder parameters of the encoding function) based on labeled samples from a first domain $\mathcal{D}_S$ (Domain A, Modified National Institute of Standards and Technology or MNIST) and the update of encoding function $\phi$ (or update of the encoder parameters) to compute encoding function $\psi$ based on data from a second domain $\mathcal{D}_T$ (Street View House Numbers or SVHN) in accordance with one embodiment of the present invention.

In more detail, in one embodiment, the Modified National Institute of Standards and Technology (MNIST) database (see, e.g., Y. LeCun, L. Bottou, Y. Bengio, and P. Haffner. "Gradient-based learning applied to document recognition." *Proceedings of the IEEE*, 86(11):2278-2324, November 1998) of handwritten digits labeled with the digit represented in the image (ground truth labels) C, represented as $(x_n^s, y_n^s)$ is used to train a model (e.g., a deep neural network) mapping from the samples $X_S$ to labels $Y_S$, where, as discussed above, the model may be viewed as the composition of an encoder $\phi$ and a linear classifier $\rho$ ($\rho \circ \phi$: $\mathcal{X} \to \mathcal{Y}$). The encoder $\phi$ represents a first portion of the model mapping inputs X to values Z in latent space (or feature space) $\mathcal{Z}$ ($\phi: \mathcal{X} \to \mathcal{Z}$) and the linear classifier $\rho$ represents a mapping of the values (or feature vectors) Z from latent space (or feature space) $\mathcal{Z}$ to labels Y in label space $\mathcal{Y}$.

The different shapes in the plots in latent (or feature) space $\mathcal{Z}$ reflect the different classes $C_k$ (in this case, the ten classes representing the digits 0 through 9). As seen in FIGS. 5A and 5B, applying the original encoder $\phi$ to the samples $X_S$ from the source (or origin) domain $\mathcal{D}_S$ results in samples that are well-clustered in $\mathcal{Z}$-space by their known labels $Y_S$, as indicated by the different shapes $C_K$. Likewise, an adapted encoder V trained based on a few labeled samples $X_T$, $Y_T$ from the second domain $\mathcal{D}_T$ also results in well-clustered results in the latent (or feature) space $\mathcal{Z}$.

To recognize the printed numbers of the deployment or target domain, the encoder $\psi$ is updated or retrained to match the labeled and unlabeled distributions of the Target domain to that of the Source (or Origin) domain, based on labeled $(x_n^T, y_n^T)$ and unlabeled samples $X'_T$ from the Street View House Numbers (SVHN) dataset (see, e.g., Y. Netzer, T. Wang, A. Coates, A. Bissacco, B. Wu, A. Y. Ng. "Reading Digits in Natural Images with Unsupervised Feature Learning." *NIPS Workshop on Deep Learning and Unsupervised Feature Learning* 2011).

Figure 6:
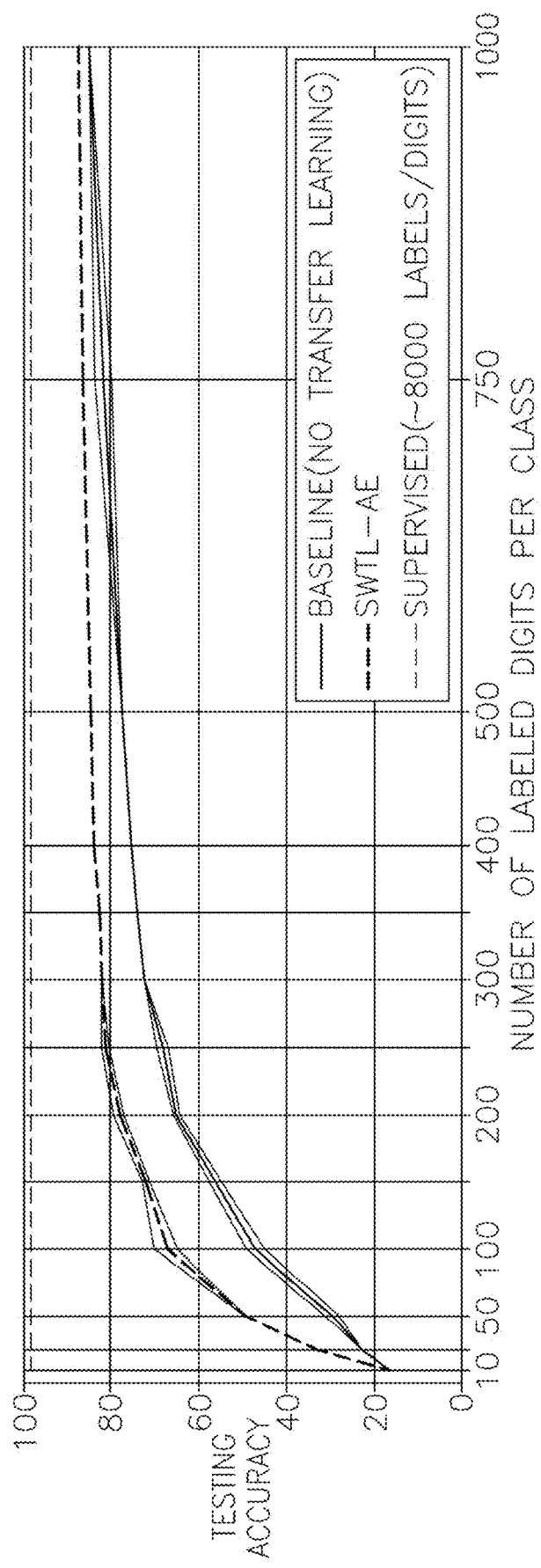
FIG. 6 is a graph comparing the digit recognition accuracy of a model trained using transfer learning in accordance with embodiments of the present invention and the digit recognition accuracy of a comparative model trained without performing transfer learning, both as function of number of labeled digits per class in the target domain.

FIG. 6 is a graph comparing the digit recognition accuracy of a model trained using transfer learning in accordance with embodiments of the present invention and the digit recognition accuracy of a comparative model trained only on $\{x_n^T, y_n^T\}_n$ without using information from the source (or origin) domain or the unlabeled data, both as function of the number of labeled digits per class in the target domain. As seen in FIG. 6, with only 10 samples from the target domain (printed digits) for each of the digits per class (e.g., a total of 100 samples), the accuracy of both models is approximately 20%. However, as the number of samples increases, the model trained in accordance with embodiments of the present invention quickly achieve better performance than the comparative model, with a 20% improvement at 100 samples per digit in the target domain (e.g., a total of 1,000 samples). The performance benefit, over comparative techniques, of embodiments of the present invention remains, although with diminishing performance gains, as the number of samples in the target domain increases. Both the model trained in accordance with embodiments of the present invention and the comparative model achieve approximately 90% accuracy with 1,000 samples per digit from the target domain.

Figure 7A:
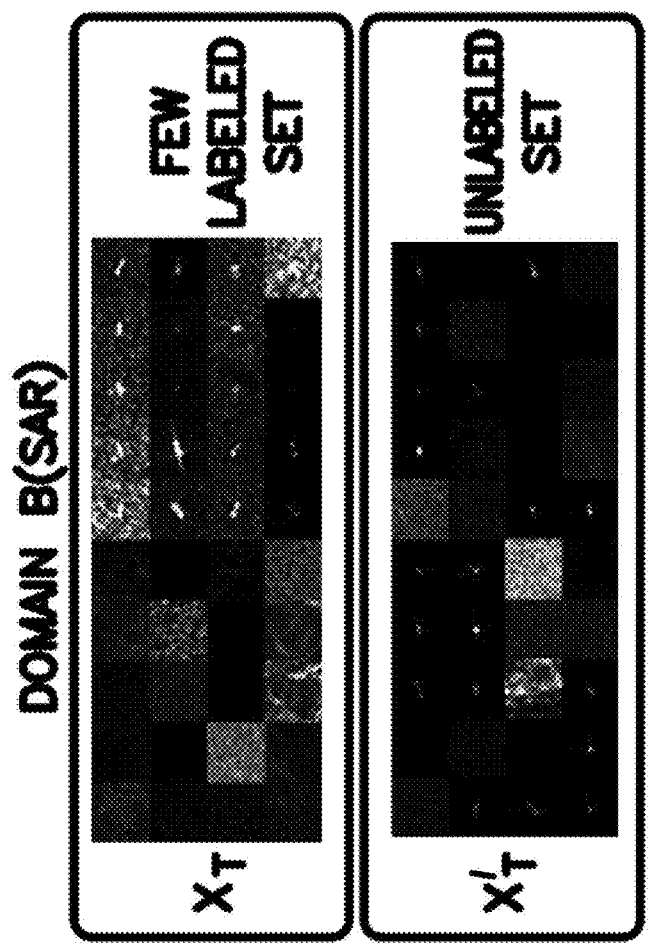
FIGS. 7A and 7B are a schematic illustration of the learning of encoding function $\phi$ (or learning of encoder parameters of the encoding function) based on data from a first domain or origin domain (Domain A, aerial electro-optical or EO camera images of ships) and the update of encoding function $\phi$ (or update of encoder parameters) to compute encoding function $\psi$ based on data from a second domain or target domain (synthetic aperture radar or SAR images of ships) in accordance with one embodiment of the present invention.
Figure 7A:
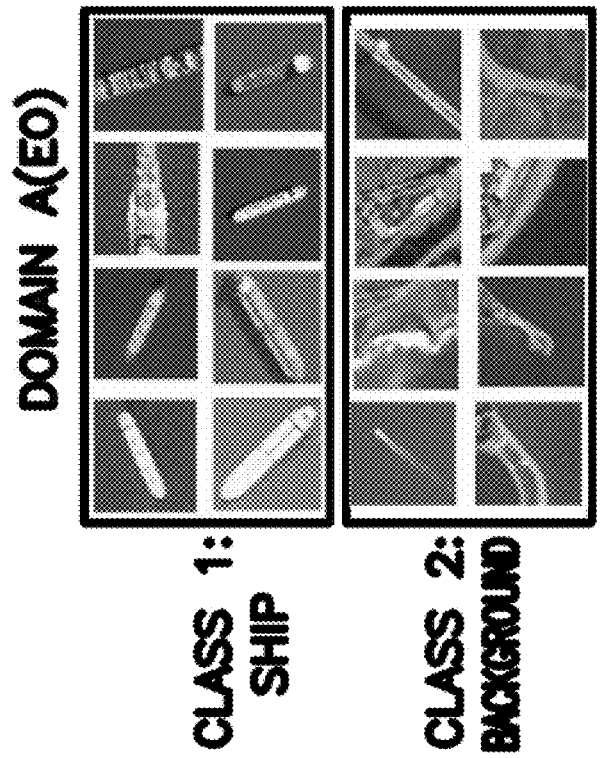
Figure 7B:
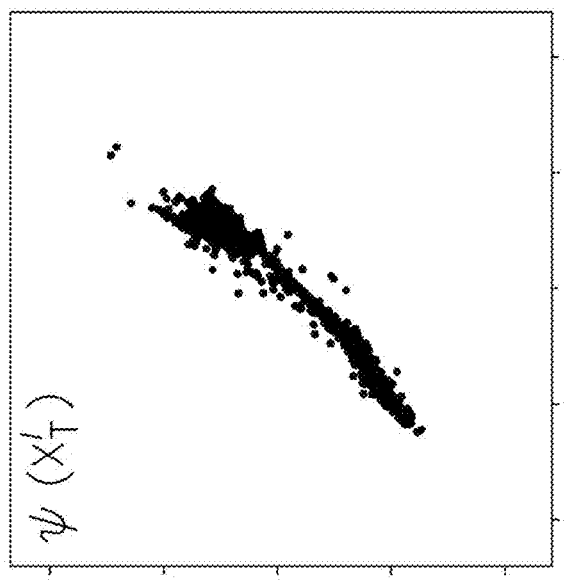
Figure 7B:
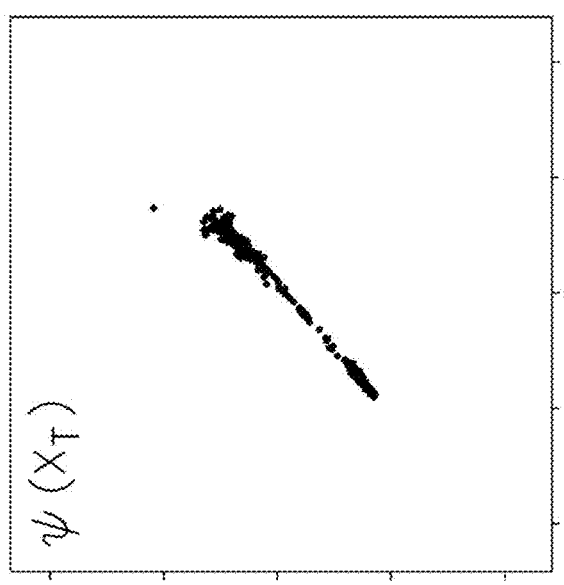
Figure 7B:
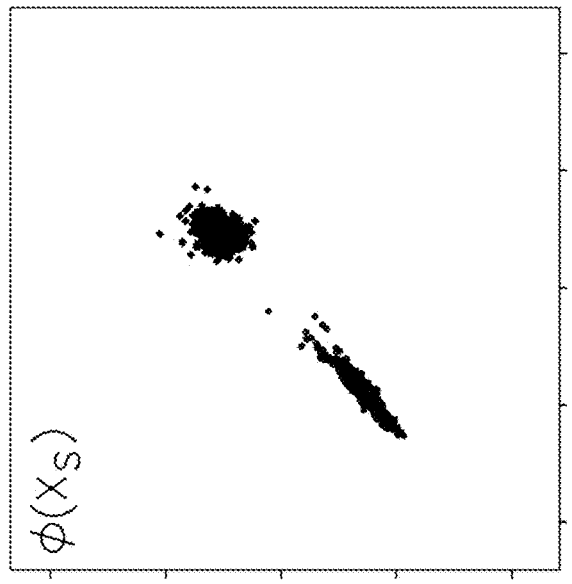

As another example, FIGS. 7A and 7B are a schematic illustration of the learning of encoding function ϕ (or learning of encoder parameters of the encoding function) based on data $X_S$ from a first domain or origin domain $\mathcal{D}_S$ (Domain A, aerial electro-optical or EO camera images of ships) and the update of encoding function ϕ (or update of encoder parameters) to compute encoding function 1P based on labeled data $X_T$ and unlabeled data $X'_T$ from a second domain $\mathcal{D}_T$ (synthetic aperture radar or SAR images of ships) in accordance with one embodiment of the present invention.

Electro-optical (EO) images are commonly used visual data in computer vision and machine learning. Many autonomous systems rely on algorithms that process and learn from EO data captured by, for example, digital cameras configured to detect light in the visible, infrared, and/or ultraviolet spectra. Deep Convolutional Neural Networks (CNNs) have been applied to classification and detection algorithms with human-level performance. However, some applications (such as continuous environmental monitoring and Earth-resource mapping) require imaging under conditions where EO imaging is not feasible, such as during night or in inclement weather.

In contrast, synthetic aperture radar (SAR) imaging provides such a capability by providing high resolution images using the radar signals which can propagate in occluded weather and which do not depend on the presence of other sources of electromagnetic radiation (e.g., the sun). However, training CNNs in the SAR domain can be challenging. Training CNNs in the EO domain leverages the availability of huge labeled datasets, which may be available through crowdsourcing labeling platforms such as Amazon Mechanical Turk and publicly available datasets such as ImageNet. However, in the SAR domain, these labeled datasets may be more difficult to obtain because, for example: preparing devices for collecting SAR datasets is much more expensive compared to EO datasets; SAR images are often classified, making public access to SAR data heavily regulated and limited; labeling SAR images needs trained experts, as opposed to the ability of lay people to perform labeling of natural EO domain images; and continuous collection of SAR data makes the labeled data unrepresentative of the current data distribution.

Accordingly, some embodiments of the present invention relate to transferring knowledge from a model trained using EO imagery to generate a model capable of making classifications based on SAR data. In particular, embodiments of the present invention relate to training an encoder ψ (e.g., learn encoder parameters) so that input samples from the domain of aerial SAR images are mapped into feature space with substantially the same distribution of input samples from the domain of aerial EO images mapped into feature space by encoder ϕ. By doing so, the same, previously trained classifier ρ may be repurposed for use with SAR images.

For the target domain, aerial SAR images of the South African Exclusive Economic Zone were preprocessed into 21 by 21 pixel sub-images. (See, e.g., Schwegmann, C.; Kleynhans, W.; Salmon, B.; Mdakane, L.; and Meyer, R. 2016. "Very deep learning for ship discrimination in synthetic aperture radar imagery." *In IEEE International Geo. and Remote Sensing Symposium*, 104-107). Accordingly, the binary ship detection problem was whether each instanced contained a "ship" (positive data points) or contained "no-ship" (negative data points). Experts analyzed the sub-images to manually label 1,596 positive data points (sub-images containing ships) and 3,192 negative data points (sub-images not containing ships).

In this example, to solve the problem of automatically classifying the SAR data using a trained model, an initial model was trained using an initial (source or origin) dataset including 4,000 color (e.g., RGB) images of ships extracted from satellite imagery of the San Francisco Bay area, captured by a constellation of satellites operated by Planet Labs Inc. Each of the images of the dataset was already labeled as "ship" or "no-ship." The initial model included an encoder ϕ and the classifier ρ, which classified the aerial electro-optical images as $C_1$: part of a ship or $C_2$: part of the background (e.g., water). In more detail, in one embodiment, a deep convolutional neural network (CNN) was trained, where the encoder portion ϕ corresponded to four layers of filters and the classifier portion ρ corresponded to two layers. The deep CNN was trained using a loss function in accordance with Equation 1 above:

$$\min_{\psi} D(p(\phi(X_S)), p(\psi(X'_T))) + \sum_k D(p(\phi(X_S)|C_k), p(\psi(X_T)|C_k))$$

Figure 8:
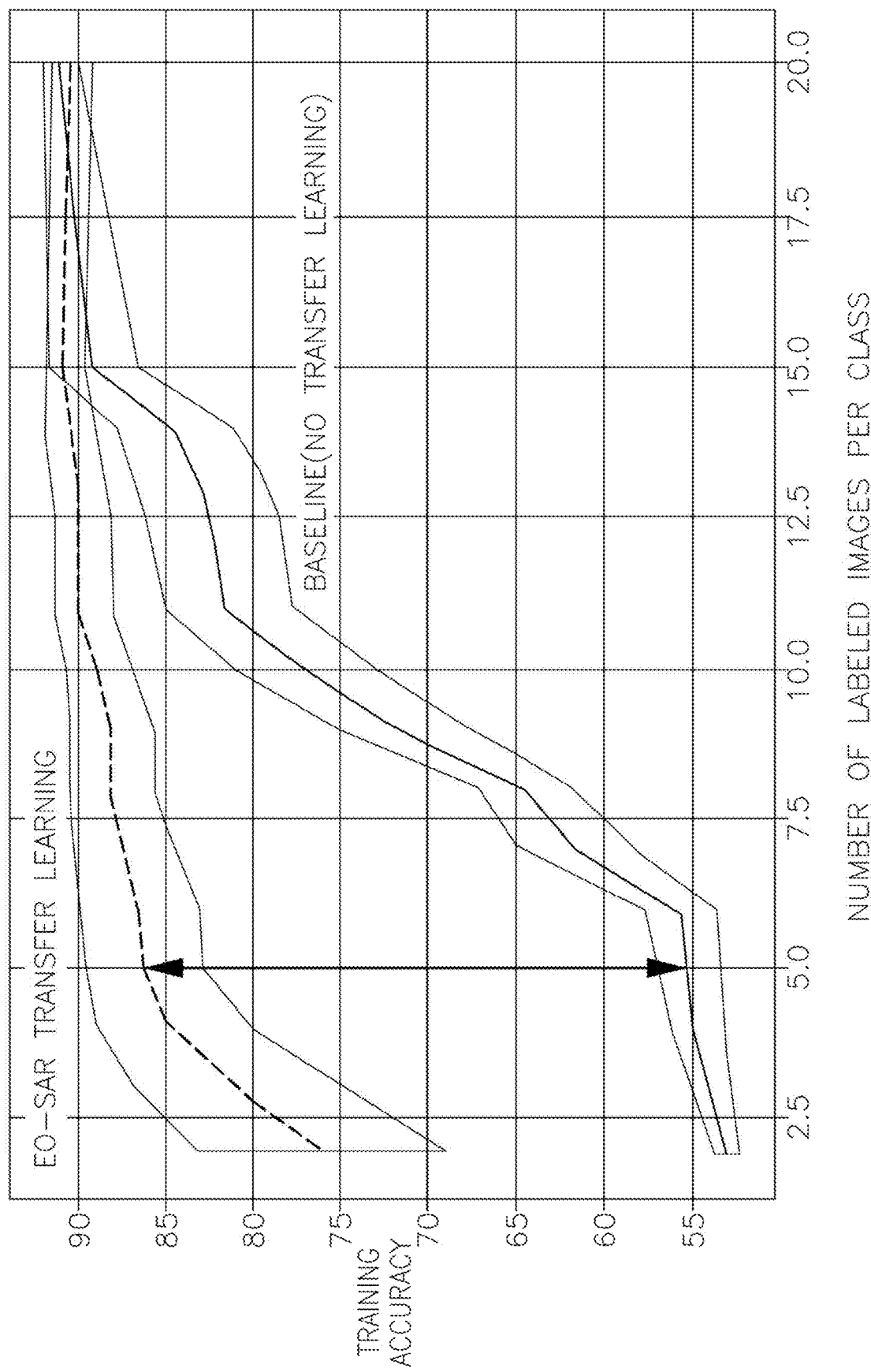
FIG. 8 is a graph comparing the ship detection accuracy of a model trained using transfer learning in accordance with embodiments of the present invention and the ship detection accuracy of a comparative model trained without performing transfer learning, both as function of the number of labeled images per class in the target domain.

FIG. 8 is a graph comparing the ship detection accuracy of a model trained using transfer learning in accordance with embodiments of the present invention and the ship detection accuracy of a comparative model trained on only the labeled target samples, not using the source (or origin) model or the unlabeled data, both as function of the number of labeled images per class in the target domain. As seen in FIG. 8, with only one labeled image per class, the EO-SAR transfer learning approach according to embodiments of the present invention already achieves over 75% accuracy in detecting ships, whereas the comparative model merely performs slightly better than chance (slightly above 50%)—in other words, a 25% improvement with only one sample. With five labeled images per class, the comparative model improves to 55% accuracy, while the model trained in accordance with embodiments of the present invention rises to about 85% accuracy, representing a 30% increase with only a few samples. Performance continues to exceed the comparative model until about 15 images per class, at which point the performance of both models levels off at approximately 90% accuracy.

Accordingly, embodiments of the present invention allow for transfer learning, enabling models (e.g., deep neural networks) trained in one domain to be applied to perform tasks in a different, but related, target domain using only a few labeled examples from the target domain (few-shot learning).

In some circumstances, labels are not available for the samples in the target domain. Therefore, some aspects of embodiments of the present invention relate to an unsupervised (e.g., automatic) technique for updating the model trained based on the source (or origin) domain to perform classification tasks on samples from a target domain.

Figure 9:
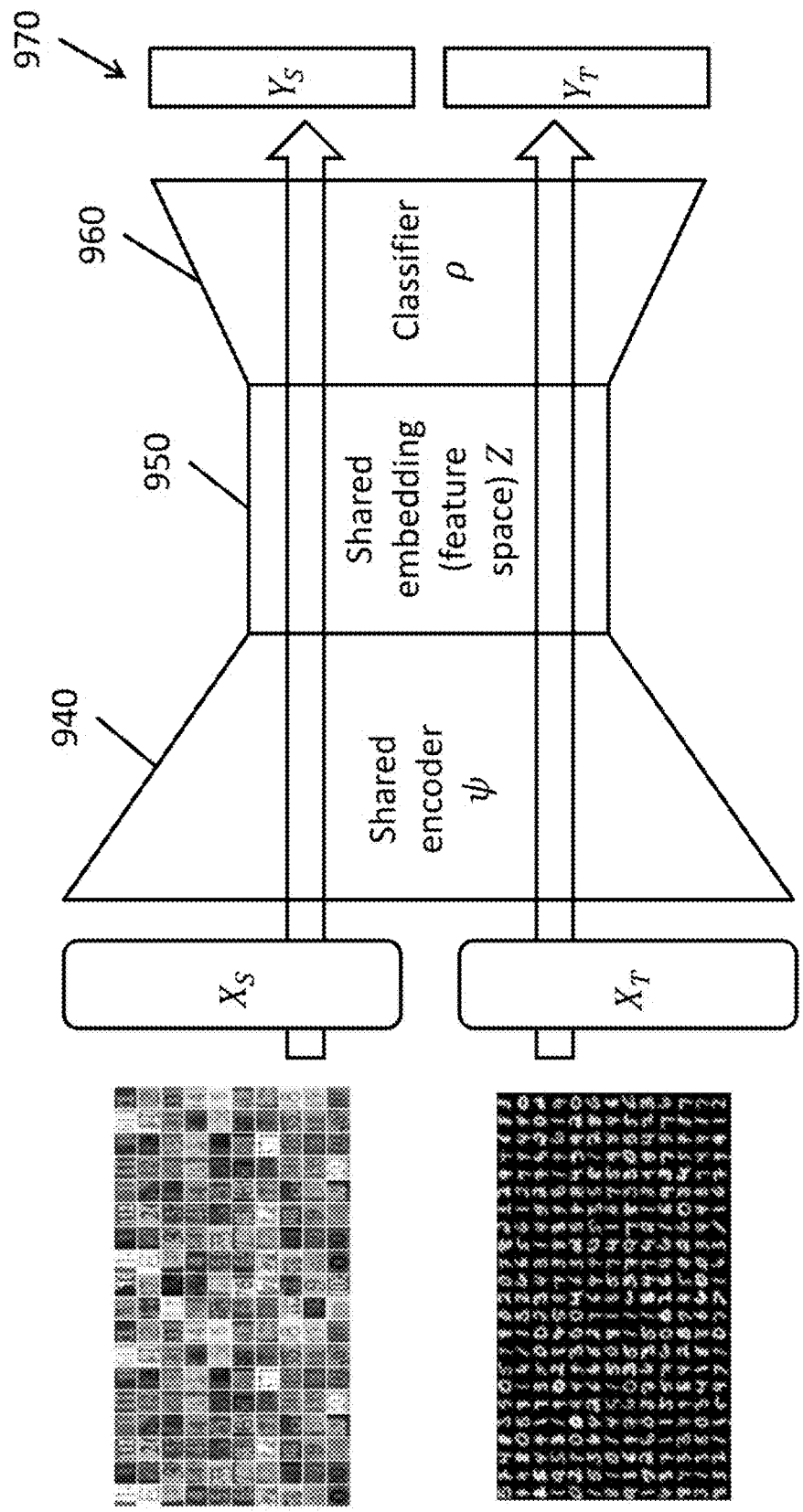
FIG. 9 is a schematic diagram of an architecture of a few-shot learning framework, after updating the original trained model (e.g., updating the encoder parameters) according to one embodiment of the present invention.

FIG. 9 is a schematic diagram of an architecture of a few-shot learning framework, after updating the original trained model according to one embodiment of the present invention. As shown in FIG. 9, samples $X_S$ from an original, pre-deployment domain $\mathcal{D}_S$ (in this example, photographs of digits from street number signs) and samples $X_T$ from a new domain $\mathcal{D}_T$ (in this example, images of handwritten digits) are supplied to a shared encoder ψ 940, which extracts features (or feature vectors) Z from the input data values (either $X_S$ from domain $\mathcal{D}_S$ or $X_T$ from domain $\mathcal{D}_T$) in accordance with a plurality of encoder parameters, where the features (or feature vectors) Z 950 are in a shared embedding or feature space or latent space $\mathcal{Z}$. A classifier ρ 960 then maps the extracted features Z from latent space $\mathcal{Z}$ to compute class labels Y 970 (including labels $Y_S$ in the source (or origin) domain $\mathcal{D}_S$ and labels $Y_T$ in the target domain $\mathcal{D}_T$) in label space $\mathcal{Y}$.

More precisely, in this example, the source (or origin) domain $\mathcal{D}_S$ includes pairs $(X_S, Y_S)$ with N labeled data points, where $X_S=[x_1^s, \ldots, x_N^s] \in \mathcal{X} \subset \mathbb{R}^{d \times N}$ denotes the samples and $Y_S=[y_1^s, \ldots, y_N^s] \in \mathcal{Y} \subset \mathbb{R}^{K \times N}$ contains the corresponding labels. Note that the label $y_n^s$ identifies the membership of corresponding sample $x_n^s$ to one or more of the K classes (e.g., the digits 0 through 9 in the classification task of digit recognition). It is also assumed that the samples $X_S$ are independent and identically distributed (i.i.d.) from the source (or origin) joint probability distribution $((x_i^s, y_i) \sim p(x^s, y))$. The source (or origin) marginal distribution over $x^s$ is denoted by $p_S$. Related target domain $\mathcal{D}_T$ has M unlabeled data points $X_T=[x_1^t, \ldots, x_M^t]$ (in some embodiments, it is assumed that M<<N). The same type of labels $\mathcal{Y}$ apply to the target domain, and it is assumed that the samples from the target domain are drawn from the target marginal distribution $x_i^t \sim P_T$. It is also assumed that distributional discrepancy exists between the two domains: $p_S \neq P_T$.

As discussed above, it is assumed that, given a large enough number N of source (or origin) samples $X_S$ and their corresponding labels $Y_S$, a parametric function can be computed (or "learned") to map from the samples to the labels $(f_\theta: \mathcal{X} \to \mathcal{Y}$, where θ denotes the parameters of the function). For example, in the case where the function $f_\theta$ is implemented as a deep neural network, the parameters θ may correspond to the learned weights of the connections between the layers of the neural network. In this case, the parameters θ can be learned by minimizing the empirical risk, $\theta = \operatorname{argmin}_\theta \Sigma_i \mathcal{L} (f_\theta(x_i^s), y_i)$, with respect to an appropriate loss function $\mathcal{L}$, such as cross entropy loss (in other words, choosing parameters to minimize the difference between the ground truth labels Y and the output of the classification function $f_\theta$).

Furthermore, as noted above, this function can be considered as the composition of an encoder function $\psi_v$ and a classifier function $\rho_w$, where v and w correspond to the learned parameters of ψ and ρ. The encoder function $\psi_v$ may correspond to the initial stages of the neural network, while the classifier function $p_w$ may correspond to the later stages of the neural network. In one embodiment, the same encoder function $\psi_v$ takes inputs from both the source domain (or origin domain) $\mathcal{X}_S$ and the target domain $\mathcal{X}_T$ and maps those inputs to feature vectors in a shared embedding space (or feature space) $\mathcal{Z}$ and is therefore a "shared" encoder $(\psi_v: \mathcal{X} \to \mathcal{Z})$. As before, the classifier ρ maps from the embedding space to the label space $(\rho: \mathcal{Z} \to \mathcal{Y})$.

Merely minimizing the term $D (p(\psi(X_S)), p(\psi(X'_T)))$ would not be sufficient to learn an appropriate encoding function ψ because it does not guarantee semantic consistency between the source domain (or origin domain) $\mathcal{X}_S$ and the target domain $\mathcal{X}_T$. Taking the specific example shown in FIG. 9, while the feature distributions $\psi(X_S)$ and $\psi(X'_T)$ may have low discrepancy (e.g., $D (p(\psi(X_S)), p(\psi(X'_T)))$ may be small), the classes might not be correctly clustered in this space. For example, multiple digits in the target domain may be clustered with the distribution of a single digit from the source (or origin) domain (e.g., images corresponding to both digits 5 and 6 from the target domain may be clustered, in feature space, with the images from the digit 6 from the source or origin domain). Therefore, the learning function should include the term that captures the semantic meanings of the values: $D(p(\psi(X_S)|C_k), p(\psi(X'_T)|C_k))$.

In the previous examples, labels $Y_T$ were available for the few examples from the target domain $\mathcal{D}_T$, which allowed calculation of the term $p(\psi(X_T^\square)|C_k)$ in the loss function. However, in some circumstances, the data samples from the target domain are unlabeled (no corresponding labels $Y_T$ are available for the target domain samples $X_T$) and therefore this term cannot be calculated directly.

Accordingly, some aspects of embodiments of the present invention relate to an unsupervised domain adaptation (UDA) algorithm which computes a surrogate of the objective by using confident pseudo labels of the target data that are obtained using the source classifier (or origin classifier) ρ. Generally, in some embodiments, the trained model is iteratively updated based on the unlabeled target domain data by computing pseudo-labels $Y'_T$ for a portion of the unlabeled target domain data $X'_T$. To calculate the pseudo-labels $Y'_T$, the linear classifier ρ is applied to the embeddings of the target data samples $X'_T$ in the latent space $\mathcal{Z}$ (the target feature vectors $\psi(X'_T)$) to compute predicted the assigned class labels C for the unlabeled data. These class labels may be associated with confidence levels. as such, the classes having with high confidence (or high probability) are assigned to the pseudo-labels $Y'_T$. This pseudo-labeled portion of the unlabeled target domain data is then used to minimize the distance between the conditional distributions (of the feature vectors) in the latent space (or feature space) $\mathcal{Z}$. As a result, as more learning iterations are performed, the number of target data points $X'_T$ with correct (or high confidence) pseudo-labels $Y'_T$ grows and progressively enforce the distributions to align conditionally.

Figure 10A:
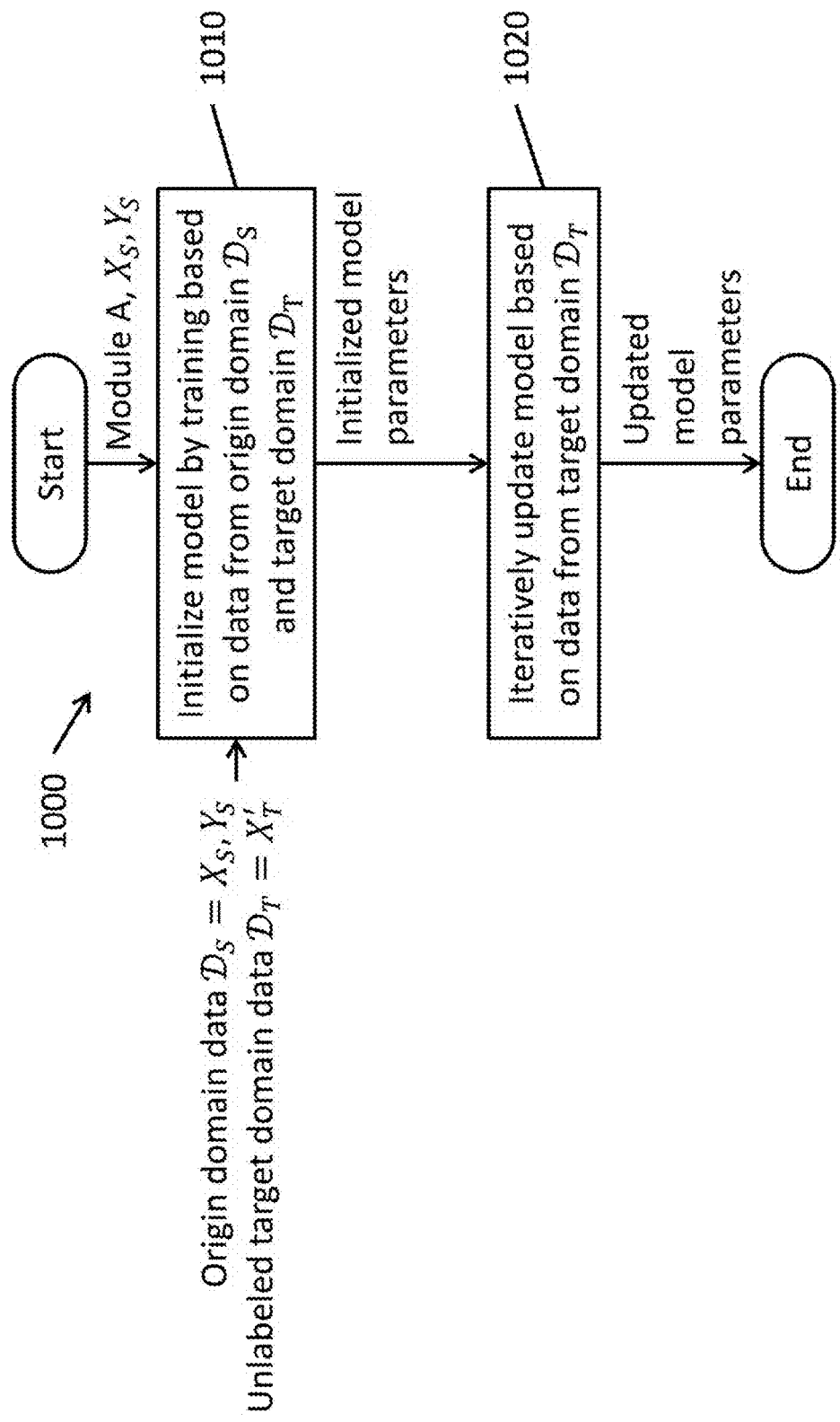
FIG. 10A is a flowchart of a method for computing the encoder parameters of the updated encoder $\psi$ according to one embodiment of the present invention.

FIG. 10A is a flowchart of a method 1000 for computing the parameters of the updated encoder ψ according to one embodiment of the present invention. In operation 1010, an initial encoder and classifier are trained based on the source (or origin) dataset. For example, in some embodiments, the training is performed using a deep reconstruction-classification network (DRCN) technique (see, e.g., Ghifary, M.; Kleijn, W. B.; Zhang, M.; Balduzzi, D.; and Li, W. 2016. "Deep reconstruction-classification networks for unsupervised domain adaptation." In *European Conference on Computer Vision*, 597-613. Springer). One benefit of DRCN over comparative techniques is that it does not rely on the use of adversarial networks (which can suffer from a mode collapse problem) and maintains a simple network architecture. However, embodiments of the present invention are not limited to DRCN, and other embodiments of the present invention may use other unsupervised domain adaptation (UDA) approaches to initialize the model shown in FIG. 10A.

In some embodiments using DRCN for the initial step, DRCN is used to both classify the source (or origin) domain data $\mathcal{D}_S = X_S, Y_S$ and also to reconstruct the labels $Y'_T$ for the unlabeled target domain data $\mathcal{D}_T = X'_T$. For both criteria to be met, the model training system automatically computes a shared encoder ψ to map both the source (or origin) and target data to the same latent space or feature embedding space or feature space $\mathcal{Z}$. To accomplish this, the DRCN uses a source label prediction pipeline and a target reconstruction pipeline. For both pipelines, a feature extractor or encoder ψ is shared. To optimize the DRCN network, the pipelines are trained in an alternating, epoch-by-epoch fashion. In one example embodiment, the feature extractor ψ has a structure as follows: 100 3×3 filters, 2×2 max-pooling layer, 150 3×3 filters, 2×2 max-pooling layer, 200 3×3 filters, and two 1,024 neuron, fully-connected layers. Dropout layers, with a rate of 50%, were used after the fully-connected layers. The classifier is a softmax layer, and a decoder, with an inverse structure of the feature extractor, completes an autoencoder. The control penalty used, λ, was set to λ=0.5 to give equal weighting to the classification and reconstruction loss. An Adam optimizer was used for all DRCN training, with optimal learning rates found to be in the range of $[0.5 \times 10^4, 3 \times 10^4]$.

Referring to FIG. 10A, in operation 1020, the classification performance of the target domain is boosted using various techniques, as described in more detail below. As noted above, in some embodiments of the present invention, a sliced-Wasserstein distance (SWD) approach is used to boost the accuracy of the initial model from operation 910 when predicting classifications of the target data. To accomplish this, aspects of embodiments of the present invention employ two methods: Pseudo-label generation for the target data, and pseudo-supervised SWD minimization between the fully-labeled source (or origin) data and the pseudo-labeled target data.

Figure 10B:
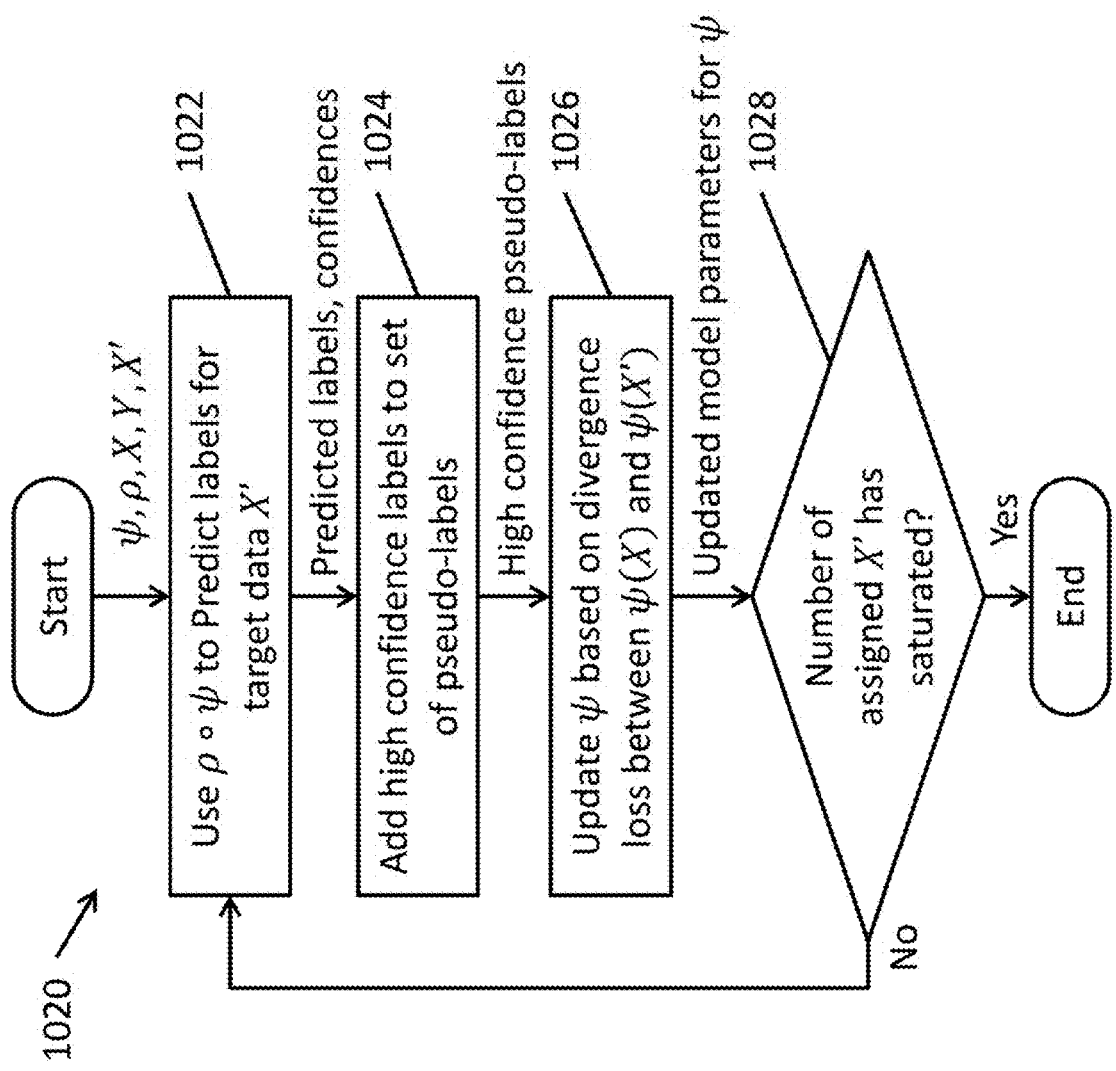
FIG. 10B is a flowchart of a method for iteratively updating the model according to one embodiment of the present invention.

FIG. 10B is a flowchart of a method for iteratively updating the model according to one embodiment of the present invention. In operation 1022, the model training system generates pseudo-labels using the source classification network ρ to predict labels $Y'_T$ of all of the target data $X'_T$. In operation 1024, if the confidence of a prediction exceeds a threshold, that example is added to a current pseudo-labeled dataset. With this approach, in general, the training process gains a partial benefit of supervised target domain training while hedging incorrect pseudo-labeling risk.

In operation 1026, the model training system computes updated intermediate encoder parameters (e.g., weights of the connections in the neural network) for the encoder ψ using the assigned pseudo-labels. In more detail, the assigned pseudo-labels enable the model training system to compute the SWD conditioned on those pseudo-labels (e.g., to compute $D(p(\psi(X_S)|C_k), p(\psi(X'_T)|C_k))$ for at least some members of $X'_T$), and therefore the updated intermediate encoder parameters can be computed in order to reduce or minimize the dissimilarity between the source and target embeddings (or origin and target feature vectors) ($\psi(X_S)$ and $\psi(X'_T)$) in $\mathcal{Z}$ space (or feature space). In some embodiments, the training procedure alternates optimization between a classification loss for the source (or origin) data $X_S$ (e.g., minimizing the number of misclassified instances of the source (or origin) data $X_S$, where $\rho(\phi(x_n^s)) \neq y_n^s$), and a pseudo-supervised SWD loss between the embedded source and target data distributions (or the distributions of the origin and target feature vectors) $\phi(X_S)$ and $\psi(X'_T)$). Alternating optimization allows the discrepancy between the source (or origin) and target distributions to be reduced in a meaningful way during the SWD training steps. In some circumstances, simultaneous optimization of both losses results in slow to no reduction in the SWD.

In operation 1028, the current intermediate encoder parameters are evaluated to determine whether stopping conditions have been met. If the stopping conditions have not been met, then the process iterates by returning to operation 1022 and calculating new predicted labels and confidences based on the updated intermediate encoder parameters of the encoder ψ. If the stopping conditions have been met (described in more detail below), then the process terminates, outputting the updated intermediate encoder parameters as the updated encoder parameters of the updated encoder ψ.

Figure 11A:
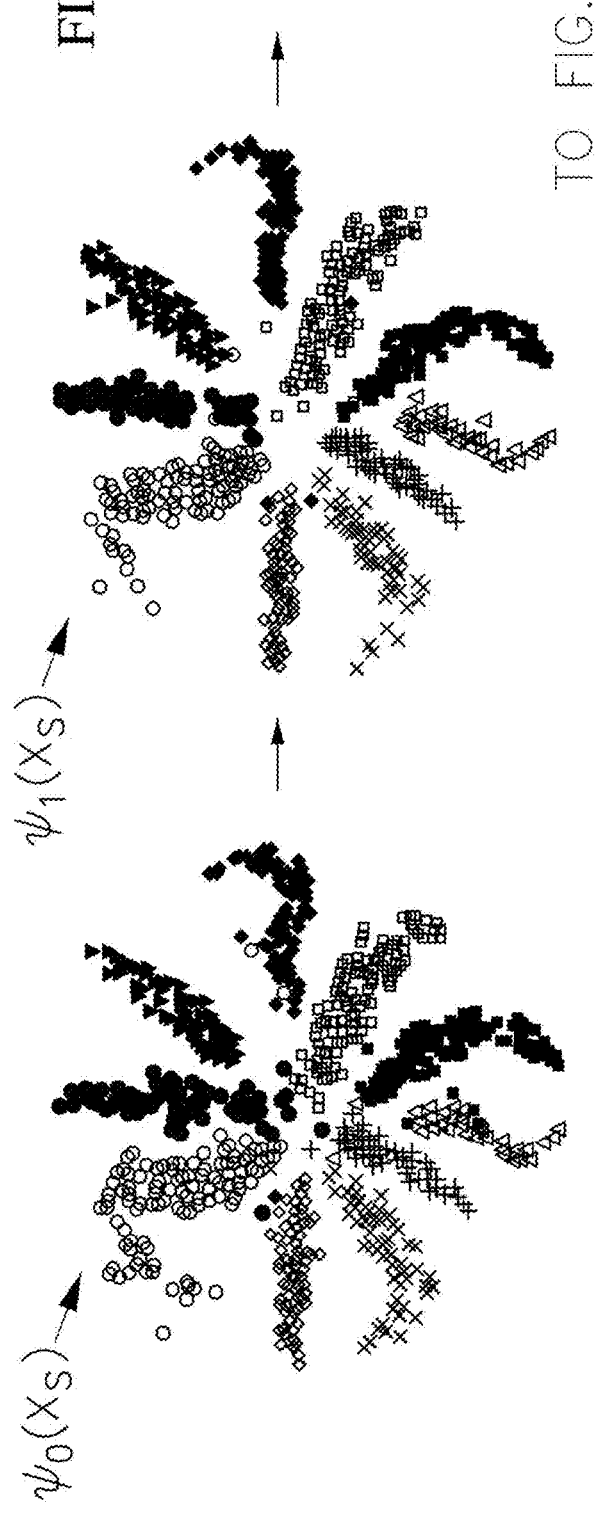
FIGS. 11A and 11B are a schematic depiction of the mappings of the origin data and the target data into feature space as the encoding function 1P is iteratively updated according to one embodiment of the present invention.
Figure 11A:
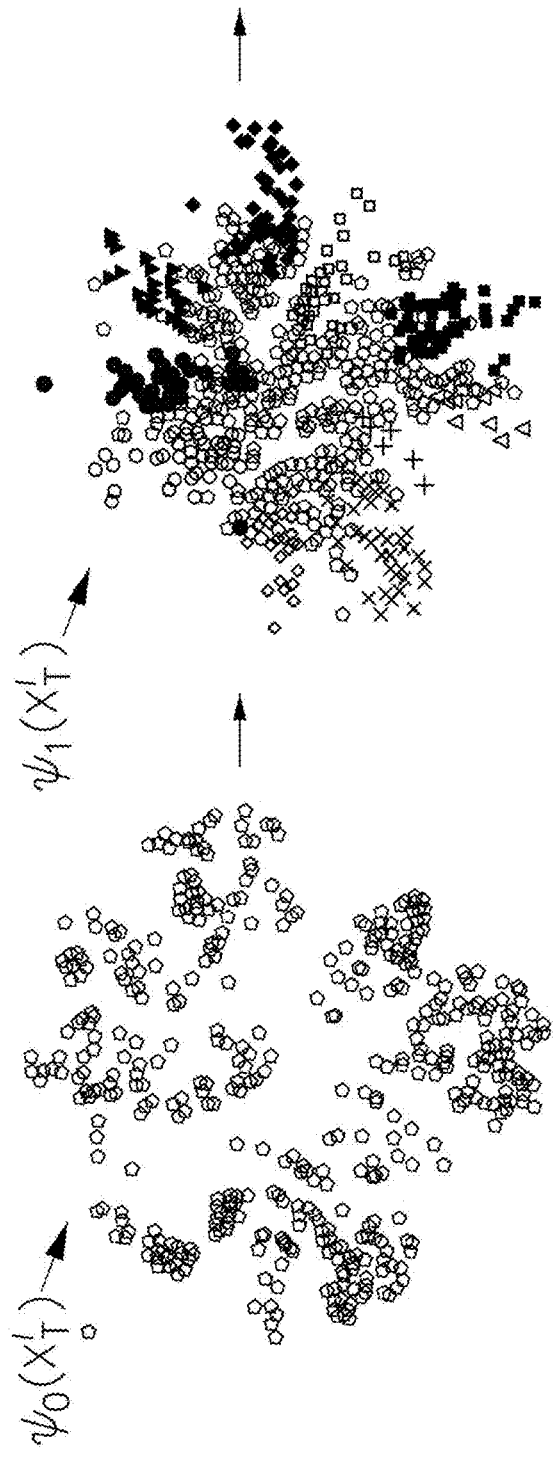
Figure 11B:
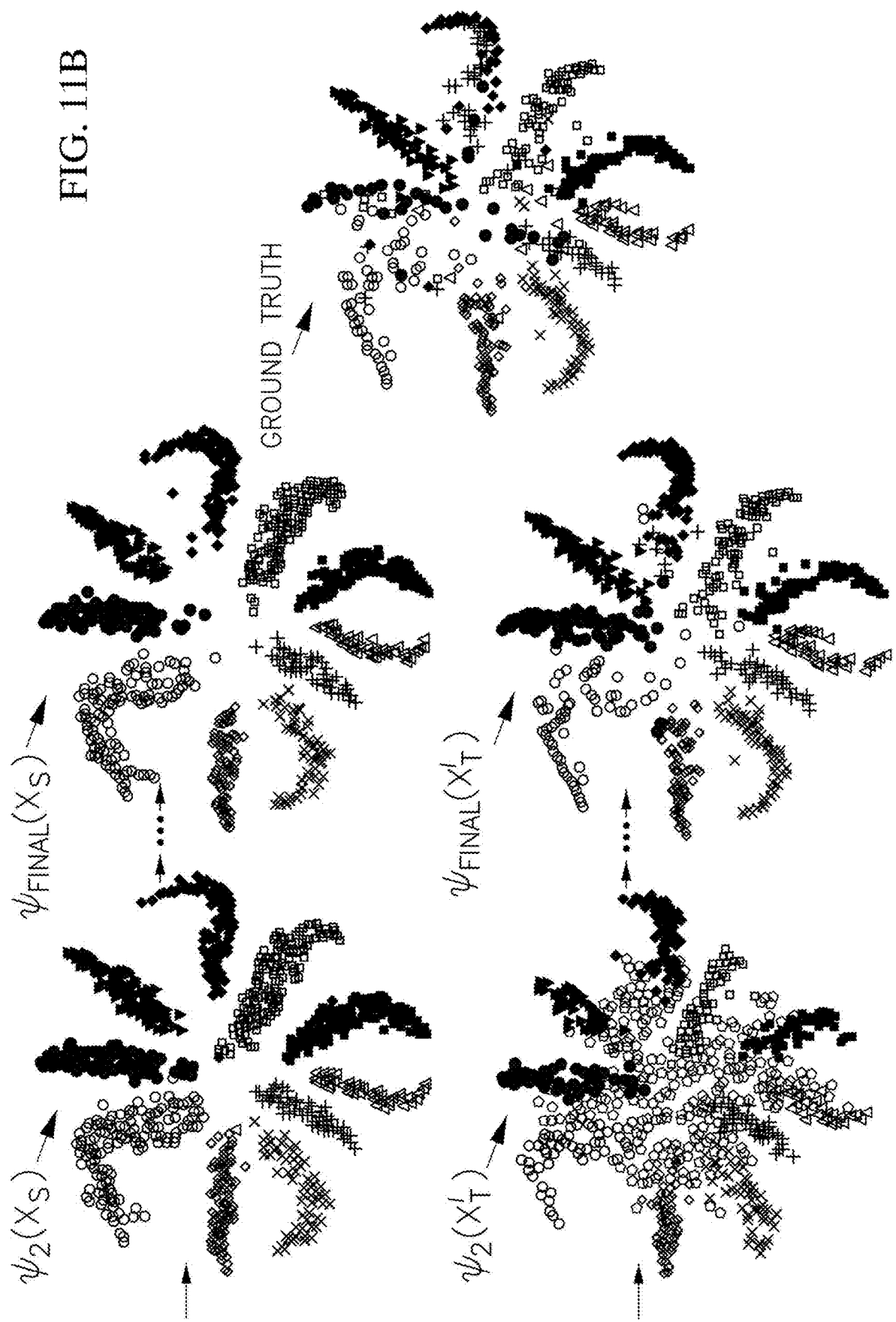

FIGS. 11A and 11B are a schematic depiction of the mappings of the source (or origin) data and the target data into embedding space as the encoding function ψ is iteratively updated according to one embodiment of the present invention. In FIGS. 11A and 11B, dots that are pentagons are unlabeled, and different other shapes indicate the different class labels of the points. As seen in FIG. 11A, the labeled source (or origin) samples X in feature space are well clustered by the initially trained encoder $\psi_0$ (trained in operation 910) in accordance with their labels (shown as $\psi_0(X_S)$ in FIG. 11A), but the initial encoder $\psi_0$ does not cluster the samples X' of the target domain well (labeled $\psi_0(X'_T)$).

After one iteration of computing classifications, adding high confidence samples, and updating the parameters of encoder ψ based on minimizing SWD loss to compute a new encoder $\psi_1$, the source (or origin) samples $X_S$ (their feature vectors) remain well-clustered as $\psi_1(X_S)$ in feature space, and some of the target samples $X'_T$ (their feature vectors) have shifted positions in feature space as $\psi_1(X'_T)$, where some of the samples are assigned pseudo-labels (different shapes) in accordance with the confidence.

As seen in FIG. 11B, after two iterations, more of the target samples $X'_T$ are labeled after being encoded by updated encoder $\psi_2$, and the target samples $X'_T$ embedded in feature space $\psi_2(X'_T)$ begin to show a clustering or arrangement more similar to that of the source (or origin) samples $X_S$ in feature space $\psi_2(X_S)$. After termination of the iteration process (described in more detail below), the final encoder $\psi_{final}$ encodes an arrangement of the target samples $X'_T$ in feature space $\psi_{final}(X'_T)$ in an arrangement that closely resembles the arrangement of the source (or origin) samples $X_S$ in feature space $\psi_{final}(X_S)$ and that also closely resembles the ground truth labels of the target data set.

In some embodiments of the present invention, the stopping conditions are derived from two metrics: the SWD loss, and the number of pseudo-labeled target data. As seen in FIGS. 11A and 11B, the SWD loss (see, e.g., Equation 6) will decrease until the pseudo-labeled target embedding distributions match those from the source distribution (or origin distribution) (note that the shape of the distribution of $\psi(X'_T)$ approaches the shape of the distribution of $\psi(X_S)$ with further iterations of the process). However, pseudo-labels are reassigned each training iteration, and the target distributions are subject to change. If the network is training properly, the number of pseudo-labeled target examples will increase as the network becomes more confident in the target data predictions (as depicted in FIGS. 11A and 11B, more of the points of $\psi(X'_T)$ are labeled with further iterations). Eventually, the number of assigned pseudo-labels will begin to saturate. The SWD loss will be minimized when the pseudo-labeled points remain relatively constant between training iterations (e.g., constant in number and relatively stable in the assignment of particular classes to particular samples). In some embodiments, this is the point when training is considered complete.

The number of pseudo-labels saturates because all easily separable target data points have moved in the shared embedding space $\mathcal{Z}$ to match the corresponding source domain (or origin domain) embeddings. If trained longer, more pseudo-labels may be assigned. However, these final pseudo-labeled points generally are not as accurate and can reduce or increase performance.

Effective training also depends on the balance of the number of optimization steps for each objective in a training iteration. For example, in one training iteration, one hundred sequential SWD optimization steps (which is easily met for the MNIST dataset with a batch size of five hundred) will cause catastrophic knowledge loss for the source (or origin) classifier. Conversely, only a few SWD optimization steps per training iteration will not improve the SWD loss. In various experimental runs, ten to fifteen SWD optimization steps and twenty to thirty classifier optimization steps per training iteration resulted in effective training. Effective training can be verified by monitoring the SWD loss at each training step to ensure that it is decreasing. Assuming appropriate learning rates, an increase in SWD loss at the start of training implies that there are too many SWD optimization steps per training iteration. On the other hand, when there are not enough SWD optimization steps in a row, then the loss will remain approximately constant.

As a concrete example, some embodiments of the present invention were implemented using the aforementioned MNIST and SVHN datasets along with a dataset collected from a United States Postal Service (USPS) post office (see Hull, Jonathan J. "A database for handwritten text recognition research." *IEEE Transactions on pattern analysis and machine intelligence* 16.5 (1994): 550-554).

In particular, the MNIST ($\mathcal{M}$), USPS ($\mathcal{U}$), and SVHN ($\mathcal{S}$) datasets have been used as a benchmark for domain adaptation. These datasets all are 10 class digit classification datasets, where MNIST and USPS are collections of handwritten digits and SVHN is a collection of real-world digit images. These three datasets can define six domain adaptation problems (e.g., adapt $\mathcal{M} \rightarrow \mathcal{U}$, adapt $\mathcal{M} \rightarrow \mathcal{S}$, adapt $\mathcal{U} \rightarrow \mathcal{M}$, adapt $\mathcal{U} \rightarrow \mathcal{S}$, adapt $\mathcal{S} \rightarrow \mathcal{M}$, and adapt $\mathcal{S} \rightarrow \mathcal{U}$). Following related work, for the case of $\mathcal{U} \rightarrow \mathcal{M}$ and $\mathcal{S} \rightarrow \mathcal{M}$, some experiments involving embodiments of the present invention used 2,000 randomly selected images from MNIST and 1,800 images from USPS. In the remaining cases, full datasets were used in the experiments discussed below. In these experiments, the images of the datasets were scaled to 32×32 pixels, with an additional step to grayscale for the SVHN dataset ($\mathcal{S}$).

In some embodiments of the present invention, data augmentation is used to create additional training data by applying reasonable transformations to input data in an effort to improve generalization (see, e.g., Simard, P. Y.; Steinkraus, D.; and Platt, J. C. 2003. "Best practices for convolutional neural networks applied to visual document analysis." In *Seventh International Conference on Document Analysis and Recognition*, 2003. *Proceedings*, 958-963). In some embodiments of the present invention, these transformations include geometric transformations and noise, and there geometric transformations may include translation, rotation, skew, zoom, Gaussian noise, Binomial noise, and inverted pixels. As shown in, e.g., Ghifary, M.; Kleijn, W. B.; Zhang, M.; Balduzzi, D.; and Li, W. 2016. Deep reconstruction-classification networks for unsupervised domain adaptation. In *European Conference on Computer Vision*, 597-613. Springer, when these transformations are applied to appropriate inputs, they greatly improve performance.

In unsupervised domain adaptation problems, there is an assumed domain shift between the source (or origin) and target domains. When the input samples are images, the visual nature of the samples allows for an intuitive understanding as to which transformations cause the domain shift and thereby allow augmentation of the source (or origin) domain data to reduce that shift before training, creating an easier optimization problem. For example, many images in the SVHN dataset contain rotated, skewed, or slightly shifted digits. Additionally, many digits are blurry and unfocused. Intuitively, if we are to transfer knowledge from the MNIST dataset, which has resolved, aligned digits, the MNIST-SVHN domain shift can be reduced by augmenting the source (or origin) training data with rotated, skewed, shifted, and noisy versions of the original MNIST training images.

Accordingly, aspects of embodiments of the present invention relate to systems and methods for adapting a model trained on a source (or origin) domain $\mathcal{D}_S$ to function in another, related target domain $\mathcal{D}_T$ using a relatively small number of samples from the target domain. Some aspects of embodiments of the present invention relate to the use of a sliced-Wasserstein distance for adapting the model trained on the source (or origin) domain data $\mathcal{D}_S$. In some embodiments, the few samples from the target domain $\mathcal{D}_T$ are labeled. In some embodiments, when the few samples from the target domain $\mathcal{D}_T$ are unlabeled, pseudo-labels are to be calculated for the unlabeled target domain samples in order to perform the adaptation.

Computing Systems

Figure 12:
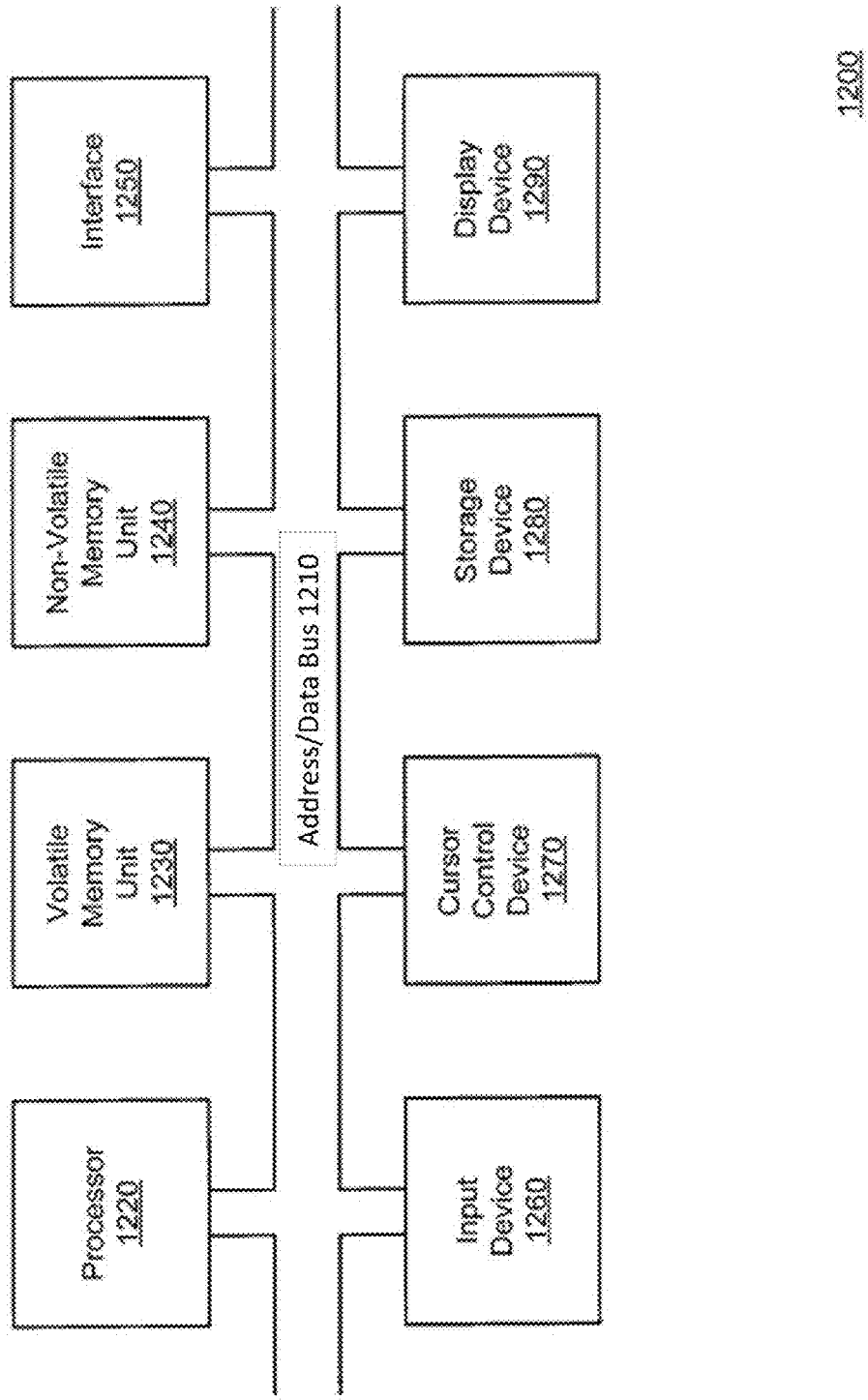
FIG. 12 is a block diagram of a computer system that may be used in conjunction with embodiments of the present invention.

An exemplary computer system 1200 in accordance with an embodiment is shown in FIG. 12. Computer systems similar to those described herein may be used, for example, to implement the model training system described above, and/or trained models in pre-deployment and in deployment, but embodiments of the present invention are not limited thereto. The exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of the exemplary computer system 1200. When executed, the instructions cause the exemplary computer system 1200 to perform specific actions and exhibit specific behavior, such as described herein.

The exemplary computer system 1200 may include an address/data bus 1210 that is configured to communicate information. Additionally, one or more data processing units, such as a processor 1220, are coupled with the address/data bus 1210. The processor 1220 is configured to process information and instructions. In an embodiment, the processor 1220 is a microprocessor. Alternatively, the processor 1220 may be a different type of processor, such as a parallel processor or a field programmable gate array.

The exemplary computer system 1200 is configured to utilize one or more data storage units. The exemplary computer system 1200 may include a volatile memory unit 1230 (e.g., random access memory ("RAM"), static RAM, dynamic RAM, etc.) coupled with the address/data bus 1210, wherein the volatile memory unit 1230 is configured to store information and instructions for the processor 1220. The exemplary computer system 1200 further may include a non-volatile memory unit 1240 (e.g., read-only memory ("ROM"), programmable ROM ("PROM"), erasable programmable ROM ("EPROM"), electrically erasable programmable ROM ("EEPROM"), flash memory, etc.) coupled with the address/data bus 1210, wherein the non-volatile memory unit 1240 is configured to store static information and instructions for the processor 1220. Alternatively, the exemplary computer system 1200 may execute instructions retrieved from an online data storage unit, such as in "cloud" computing. In an embodiment, the exemplary computer system 1200 also may include one or more interfaces, such as an interface 1250, coupled with the address/data bus 1210. The one or more interfaces are configured to enable the exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, the exemplary computer system 1200 may include an input device 1260 coupled with the address/data bus 1210, wherein the input device 1260 is configured to communicate information and command selections to the processor 1220. In accordance with one embodiment, the input device 1260 is an alphanumeric input device, such as a keyboard, that may include alphanumeric and/or function keys. Alternatively, the input device 1260 may be an input device other than an alphanumeric input device. In an embodiment, the exemplary computer system 1200 may include a cursor control device 1270 coupled with the address/data bus 1210, wherein the cursor control device 1270 is configured to communicate user input information and/or command selections to the processor 1220. In an embodiment, the cursor control device 1270 is implemented utilizing a device such as a mouse, a track-ball, a track-pad, an optical tracking device, or a touchscreen. The foregoing notwithstanding, in an embodiment, the cursor control device 1270 is directed and/or activated via input from the input device 1260, such as in response to the use of special keys and key sequence commands associated with the input device 1260. In an alternative embodiment, the cursor control device 1270 is configured to be directed or guided by voice commands.

Figure 13:
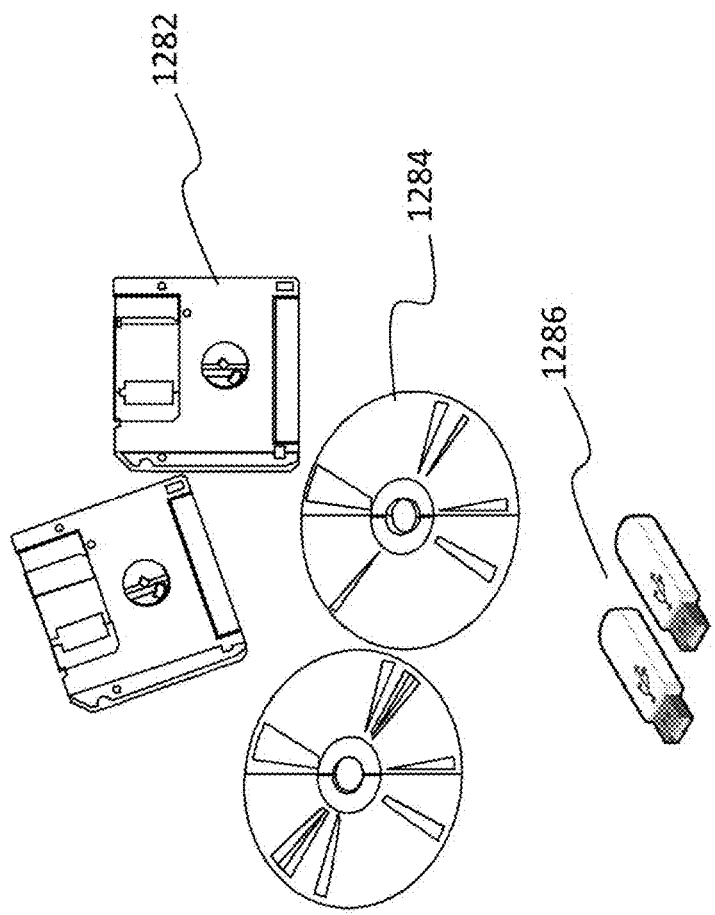
FIG. 13 is a depiction of some forms of non-volatile storage media.

In an embodiment, the exemplary computer system 1200 further may include one or more optional computer usable data storage devices, such as a storage device 1280, coupled with the address/data bus 1210. The storage device 1280 is configured to store information and/or computer executable instructions. In one embodiment, as shown in FIG. 13, the storage device 1280 is a storage device such as a magnetic or optical disk drive (e.g., hard disk drive ("HDD"), floppy diskette 1282, compact disc read-only memory ("CD-ROM") 1284, digital versatile disc ("DVD")), or flash memory (e.g., NAND flash in the form of a USB drive) 1286. Pursuant to one embodiment, a display device 1290 is coupled with the address/data bus 1210, wherein the display device 1290 is configured to display video and/or graphics. In an embodiment, the display device 1290 may include a cathode ray tube ("CRT"), liquid crystal display ("LCD"), field emission display ("FED"), plasma display, or any other display device suitable for displaying video and/or graphic images and alphanumeric characters recognizable to a user.

The exemplary computer system 1200 is presented herein as an exemplary computing environment in accordance with an embodiment. However, the exemplary computer system 1200 is not strictly limited to being a computer system. For example, an embodiment provides that the exemplary computer system 1200 represents a type of data processing analysis that may be used in accordance with various embodiments described herein. Moreover, other computing systems may also be implemented. Indeed, the spirit and scope of the present technology is not limited to any single data processing environment. Thus, in an embodiment, one or more operations of various embodiments of the present technology are controlled or implemented utilizing computer-executable instructions, such as program modules, being executed by a computer. In one exemplary implementation, such program modules include routines, programs, objects, components, and/or data structures that are configured to perform particular tasks or implement particular abstract data types. In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for training a controller to control a robotic system in a target domain, the method comprising:
   receiving a neural network of an original controller for controlling the robotic system based on a plurality of origin data samples from an origin domain and corresponding labels in a label space, the neural network of the original controller comprising a plurality of first encoder parameters and a plurality of classifier parameters, the neural network being trained to:
     map an input data sample from the origin domain to a feature vector in a feature space in accordance with the first encoder parameters; and
     assign a label of the label space to the input data sample based on the feature vector in accordance with the classifier parameters;
   computing a plurality of second encoder parameters by iteratively updating a plurality of intermediate encoder parameters based on the first encoder parameters to minimize a dissimilarity, in the feature space, between:
     a plurality of origin feature vectors computed from the origin data samples using the first encoder parameters; and
     a plurality of target feature vectors computed from a plurality of target data samples from the target domain using the intermediate encoder parameters, the target data samples having a smaller cardinality than the origin data samples,
   wherein the dissimilarity is computed based on an unsupervised loss function term and a supervised loss function term in accordance with a sliced Wasserstein distance between:
     the origin feature vectors encoded in the feature space using the first encoder parameters; and
     the target feature vectors encoded in the feature space using the intermediate encoder parameters, and
   wherein the intermediate encoder parameters and the second encoder parameters are different from the first encoder parameters; and
   updating the controller with the second encoder parameters to control the robotic system in the target domain.

2. The method of claim 1, wherein the updating the first encoder parameters comprises iteratively computing the plurality of intermediate encoder parameters, each iteration comprising:
   computing the origin feature vectors in the feature space;

computing the target feature vectors in the feature space in accordance with the intermediate encoder parameters;
computing the dissimilarity between the origin feature vectors and the target feature vectors;
updating the intermediate encoder parameters to reduce the dissimilarity between the origin feature vectors and the target feature vectors;
determining whether the dissimilarity is minimized;
in response to determining that the dissimilarity is not minimized, proceeding with another iteration with the updated intermediate encoder parameters as the intermediate encoder parameters; and
in response to determining that the dissimilarity is minimized, outputting the intermediate encoder parameters as the second encoder parameters.

3. The method of claim 2, wherein the computing the origin feature vectors is performed by an origin encoder.

4. The method of claim 1, wherein the target data samples comprise a plurality of target samples and a plurality of corresponding target labels.

5. The method of claim 1, wherein the target data samples comprise a plurality of unlabeled target samples.

6. The method of claim 5, wherein the updating the first encoder parameters further comprises iteratively updating the plurality of intermediate encoder parameters based on high-confidence predicted labels for the target feature vectors, each iteration comprising:
computing the origin feature vectors in the feature space in accordance with the intermediate encoder parameters;
computing the target feature vectors in the feature space in accordance with the intermediate encoder parameters;
computing predicted labels for the target feature vectors in accordance with the classifier parameters, each of the predicted labels being associated with a confidence;
defining a plurality of pseudo-labels corresponding to the predicted labels having confidences exceeding a threshold;
updating the intermediate encoder parameters based on at least one of:
minimizing a dissimilarity between the origin feature vectors and the target feature vectors; and
minimizing a classification loss of the origin data samples;
determining whether a stopping condition has been met, wherein the stopping condition comprises at least one of:
a dissimilarity between the origin feature vectors and the target feature vectors; and
a saturation of a number of the pseudo-labels between iterations;
in response to determining that the stopping condition has not been met, proceeding with another iteration with the updated intermediate encoder parameters as the intermediate encoder parameters; and
in response to determining that the stopping condition is met, outputting the intermediate encoder parameters as the second encoder parameters.

7. The method of claim 6, wherein the updating the intermediate encoder parameters alternates between:
the minimizing the dissimilarity between the origin feature vectors and the target feature vectors; and
the minimizing the classification loss of the origin data samples.

8. The method of claim 1, wherein the neural network comprises a convolutional neural network, a recurrent neural network, a capsule network, or combinations thereof.

9. A system for training a controller to control a robotic system in a target domain, the system comprising:
a processor; and
non-volatile memory storing instructions that, when executed by the processor, cause the processor to:
receive a neural network of an original controller for controlling the robotic system based on a plurality of origin data samples from an origin domain and corresponding labels in a label space, the neural network of the original controller comprising a plurality of first encoder parameters and a plurality of classifier parameters, the neural network being trained to:
map an input data sample from the origin domain to a feature vector in a feature space in accordance with the first encoder parameters; and
assign a label of the label space to the input data sample based on the feature vector in accordance with the classifier parameters;
compute a plurality of second encoder parameters by iteratively updating a plurality of intermediate encoder parameters based on the first encoder parameters to minimize a dissimilarity between:
a plurality of origin feature vectors computed from the origin data samples using the first encoder parameters; and
a plurality of target feature vectors computed from a plurality of target data samples from the target domain using the intermediate encoder parameters, the target data samples having a smaller cardinality than the origin data samples,
wherein the dissimilarity is computed based on an unsupervised loss function term and a supervised loss function term in accordance with a sliced Wasserstein distance between:
the origin feature vectors encoded in the feature space using the first encoder parameters; and
the target feature vectors encoded in the feature space using the intermediate encoder parameters, and
wherein the intermediate encoder parameters and the second encoder parameters are different from the first encoder parameters; and
update the controller with the second encoder parameters to control the robotic system in the target domain.

10. The system of claim 9, wherein the instructions that cause the processor to update the first encoder parameters comprise instructions that, when executed by the processor cause the processor to iteratively compute the plurality of intermediate encoder parameters, each iteration comprising:
computing the origin feature vectors in the feature space;
computing the target feature vectors in the feature space in accordance with the intermediate encoder parameters;
computing the dissimilarity between the origin feature vectors and the target feature vectors;
updating the intermediate encoder parameters to reduce the dissimilarity between the origin feature vectors and the target feature vectors;
determining whether the dissimilarity is minimized;
in response to determining that the dissimilarity is not minimized, proceeding with another iteration with the updated intermediate encoder parameters as the intermediate encoder parameters; and in response to determining that the dissimilarity is minimized, outputting the intermediate encoder parameters as the second encoder parameters.

11. The system of claim 9, wherein the target data samples comprise a plurality of target samples and a plurality of corresponding target labels.

12. The system of claim 9, wherein the target data samples comprise a plurality of unlabeled target samples.

13. The system of claim 12, wherein the instructions that cause the processor to update the first encoder parameters comprise instructions that, when executed by the processor, cause the processor to compute the second encoder parameters by iteratively updating the plurality of intermediate encoder parameters based on high-confidence predicted labels for the target feature vectors, each iteration comprising:

computing the origin feature vectors in the feature space in accordance with the intermediate encoder parameters;

computing the target feature vectors in the feature space in accordance with the intermediate encoder parameters;

computing predicted labels for the target feature vectors in accordance with the classifier parameters, each of the predicted labels being associated with a confidence;

defining a plurality of pseudo-labels corresponding to the predicted labels having confidences exceeding a threshold;

updating the intermediate encoder parameters based on at least one of:
minimizing a dissimilarity between the origin feature vectors and the target feature vectors; and
minimizing a classification loss of the origin data samples;

determining whether a stopping condition has been met, wherein the stopping condition comprises at least one of:
a dissimilarity between the origin feature vectors and the target feature vectors; and
a saturation of a number of the pseudo-labels between iterations;

in response to determining that the stopping condition has not been met, proceeding with another iteration with the updated intermediate encoder parameters as the intermediate encoder parameters; and in response to determining that the stopping condition is met, outputting the intermediate encoder parameters as the second encoder parameters.

14. The system of claim 13, wherein the updating the intermediate encoder parameters alternates between:
the minimizing the dissimilarity between the origin feature vectors and the target feature vectors; and
the minimizing a classification loss of the origin data samples.

15. The system of claim 9, wherein the neural network comprises a convolutional neural network, a recurrent neural network, a capsule network, or combinations thereof.

16. A non-transitory computer readable medium having instructions stored thereon that, when executed by a processor, cause the processor to:

receive a neural network of an original controller for controlling a robotic system based on a plurality of origin data samples from an origin domain and corresponding labels in a label space, the neural network of the original controller comprising a plurality of first encoder parameters and a plurality of classifier parameters, the neural network being trained to:

map an input data sample from the origin domain to a feature vector in a feature space in accordance with the first encoder parameters; and assign a label of the label space to the input data sample based on the feature vector in accordance with the classifier parameters;

compute a plurality of second encoder parameters by iteratively updating a plurality of intermediate encoder parameters based on the first encoder parameters to minimize a dissimilarity between:

a plurality of origin feature vectors computed, using the first encoder parameters, from the origin data samples; and a plurality of target feature vectors computed, using the intermediate encoder parameters, from a plurality of target data samples from a target domain, the target data samples having a smaller cardinality than the origin data samples, wherein the dissimilarity is computed based on an unsupervised loss function term and a supervised loss function term in accordance with a sliced Wasserstein distance between:

the origin feature vectors encoded in the feature space using the first encoder parameters; and the target feature vectors encoded in the feature space using the intermediate encoder parameters, and wherein the intermediate encoder parameters and the second encoder parameters are different from the first encoder parameters; and update the controller with the second encoder parameters to control a robotic system in the target domain.

17. The non-transitory computer readable medium of claim 16, wherein the instructions that cause the processor to update the first encoder parameters further comprise instructions that, when executed by the processor cause the processor to iteratively update the plurality of intermediate encoder parameters, each iteration comprising:

computing the origin feature vectors in the feature space;

computing the target feature vectors in the feature space in accordance with the intermediate encoder parameters;

computing the dissimilarity between the origin feature vectors and the target feature vectors;

updating the intermediate encoder parameters to reduce the dissimilarity between the origin feature vectors and the target feature vectors;

determining whether the dissimilarity is minimized;

in response to determining that the dissimilarity is not minimized, proceeding with another iteration with the updated intermediate encoder parameters as the intermediate encoder parameters; and in response to determining that the dissimilarity is minimized, outputting the intermediate encoder parameters as the second encoder parameters.

18. The non-transitory computer readable medium of claim 16, wherein the target data samples comprise a plurality of target samples and a plurality of corresponding target labels.

19. The non-transitory computer readable medium of claim 16, wherein the target data samples comprise a plurality of unlabeled target samples.

20. The non-transitory computer readable medium of claim 19, wherein the instructions that cause the processor to update the first encoder parameters further comprise instructions that, when executed by the processor, cause the processor to compute the second encoder parameters by iteratively computing a plurality of intermediate encoder parameters, each iteration comprising:
  computing the origin feature vectors in the feature space in accordance with the intermediate encoder parameters;
  computing the target feature vectors in the feature space in accordance with the intermediate encoder parameters;
  computing predicted labels for the target feature vectors using the classifier parameters, each of the predicted labels being associated with a confidence;
  defining a plurality of pseudo-labels corresponding to the predicted labels having confidences exceeding a threshold;
  updating the intermediate encoder parameters based on at least one of:
    minimizing a dissimilarity between the origin feature vectors and the target feature vectors; and
    minimizing a classification loss of the origin data samples;
  determining whether a stopping condition has been met, wherein the stopping condition comprises at least one of:
    a dissimilarity between the origin feature vectors and the target feature vectors; and
    a saturation of a number of the pseudo-labels between iterations;
  in response to determining that the stopping condition has not been met, proceeding with another iteration with the updated intermediate encoder parameters as the intermediate encoder parameters; and
  in response to determining that the stopping condition is met, outputting the intermediate encoder parameters as the second encoder parameters.

21. The non-transitory computer readable medium of claim 20, wherein the updating the intermediate encoder parameters alternates between:
  the minimizing the dissimilarity between the origin feature vectors and the target feature vectors; and
  the minimizing the classification loss of the origin data samples.

22. The non-transitory computer readable medium of claim 16, wherein the neural network comprises a convolutional neural network, a recurrent neural network, a capsule network, or combinations thereof.

* * * * *